(12) United States Patent
Liberti

(10) Patent No.: US 9,885,772 B1
(45) Date of Patent: Feb. 6, 2018

(54) GEOLOCATING WIRELESS EMITTERS

(71) Applicant: Vencore Labs, Inc., Basking Ridge, NJ (US)

(72) Inventor: Joseph C. Liberti, Howell, NJ (US)

(73) Assignee: Vencore Labs, Inc., Basking Ridge, NJ (US)

( * ) Notice: Subject to any disclaimer, the term of this patent is extended or adjusted under 35 U.S.C. 154(b) by 0 days.

(21) Appl. No.: 14/995,903

(22) Filed: Jan. 14, 2016

Related U.S. Application Data

(63) Continuation of application No. 14/836,059, filed on Aug. 26, 2015, now abandoned.

(60) Provisional application No. 62/042,073, filed on Aug. 26, 2014.

(51) Int. Cl.
*G01S 5/02* (2010.01)
*G01S 5/06* (2006.01)
*G01S 5/10* (2006.01)

(52) U.S. Cl.
CPC .......... *G01S 5/0252* (2013.01); *G01S 5/0221* (2013.01); *G01S 5/06* (2013.01); *G01S 5/0215* (2013.01); *G01S 5/10* (2013.01)

(58) Field of Classification Search
CPC .... G01S 5/0252; G01S 5/0221; G01S 5/0215; G01S 5/06; G01S 5/10; G01S 19/40; G01S 19/42; G01S 19/07; G01S 19/52; G01S 19/22; G01S 19/428; G01S 13/878
USPC .............. 342/451, 453, 464, 357.23, 357.35, 342/357.44, 357.61
See application file for complete search history.

(56) References Cited

U.S. PATENT DOCUMENTS

| | | |
|---|---|---|
| 3,943,514 A | 3/1976 | Afendykiw |
| 3,969,726 A | 7/1976 | Birleson |
| 4,114,153 A | 9/1978 | Neidell |
| 4,173,760 A | 11/1979 | Garrison |
| 4,215,936 A | 8/1980 | Winocur |
| RE31,509 E | 1/1984 | Neidell |
| 5,079,555 A | 1/1992 | Turpin |
| 5,162,862 A | 11/1992 | Bartram |
| 5,185,578 A | 2/1993 | Stolarczykz |
| 5,451,839 A | 9/1995 | Rappaport |
| 5,533,062 A | 7/1996 | Liberti |
| 5,602,568 A | 2/1997 | Kim |
| 5,751,243 A | 5/1998 | Turpin |
| 5,793,483 A | 8/1998 | Zehnpfennig |
| 5,822,383 A | 10/1998 | Muntz |
| 5,943,427 A | 8/1999 | Massie |

(Continued)

*Primary Examiner* — Chuong P Nguyen
(74) *Attorney, Agent, or Firm* — Heslin Rothenberg Farley & Mesiti P.C.; George Blasiak

(57) ABSTRACT

Provided herein are processes for locating wireless emitters. The processes provided may include use of an apparatus that includes a signal processing circuit configured to obtain a reference signal and a target signal, and process the reference signal and target signal to determine and output a reference channel value and a target channel value. The processes provided may also include use of an apparatus that includes a signal processing circuit configured to obtain a pair of reference channel values and a pair of target channel values, process the reference channel values and pair of target channel values to determine a phase-difference metric, and process the phase-difference metric to determine a set of spatial location coordinates. The set of spatial location coordinates may correspond to a location of a target emitter.

29 Claims, 5 Drawing Sheets

(56) References Cited

U.S. PATENT DOCUMENTS

| | | | |
|---|---|---|---|
| 5,973,643 A * | 10/1999 | Hawkes | G01S 1/045 |
| | | | 342/457 |
| RE36,819 E | 8/2000 | Gellner | |
| 6,114,984 A | 9/2000 | McNiff | |
| 6,300,903 B1 * | 10/2001 | Richards | G01S 13/42 |
| | | | 342/357.59 |
| 6,339,396 B1 | 1/2002 | Mayersak | |
| 6,459,903 B1 * | 10/2002 | Lee | H04W 64/00 |
| | | | 342/457 |
| 6,748,224 B1 * | 6/2004 | Chen | G01S 5/0036 |
| | | | 342/451 |
| 6,762,721 B2 * | 7/2004 | Halsey | G01S 5/10 |
| | | | 342/442 |
| 6,768,963 B2 * | 7/2004 | Liberti, Jr. | G01S 5/0215 |
| | | | 702/150 |
| 6,882,315 B2 * | 4/2005 | Richley | G01S 5/06 |
| | | | 342/387 |
| 6,898,430 B1 | 5/2005 | Liberti | |
| 7,225,548 B2 | 6/2007 | Sieracki | |
| 7,289,391 B2 | 10/2007 | Tietjen | |
| 7,292,189 B2 * | 11/2007 | Orr | G01S 5/06 |
| | | | 342/387 |
| 7,468,695 B1 | 12/2008 | Williams | |
| 7,646,330 B2 | 1/2010 | Karr | |
| 7,711,375 B2 * | 5/2010 | Liu | G01S 5/02 |
| | | | 342/457 |
| 7,904,244 B2 * | 3/2011 | Sugla | G01C 21/00 |
| | | | 342/451 |
| 7,911,385 B2 * | 3/2011 | Heuser | G01S 5/0273 |
| | | | 342/450 |
| 8,111,669 B2 | 2/2012 | Liberti, Jr. | |
| 8,433,337 B2 | 4/2013 | Chin | |
| 8,456,349 B1 | 6/2013 | Piesinger | |
| 8,670,418 B2 | 3/2014 | Liberti, Jr. | |
| 8,717,229 B2 | 5/2014 | Blachford | |
| 8,723,719 B1 | 5/2014 | Piesinger | |
| RE45,061 E | 8/2014 | Karr | |
| 8,942,658 B2 | 1/2015 | Banwell | |
| 9,354,297 B2 * | 5/2016 | Ling | G01S 5/0226 |
| 9,377,533 B2 | 6/2016 | Smits | |
| 9,661,604 B1 * | 5/2017 | O'Shea | H04W 24/10 |
| 9,713,117 B2 * | 7/2017 | Khoryaev | H04W 64/00 |
| 2002/0135509 A1 | 9/2002 | Talbot | |
| 2003/0004640 A1 | 1/2003 | Vayanos | |
| 2003/0176196 A1 * | 9/2003 | Hall | G01S 5/0205 |
| | | | 455/456.1 |
| 2003/0233210 A1 | 12/2003 | Liberti, Jr. | |
| 2005/0111414 A1 | 5/2005 | Liberti | |
| 2005/0156780 A1 | 7/2005 | Bonthron | |
| 2008/0048907 A1 | 2/2008 | Matsuura | |
| 2008/0165059 A1 | 7/2008 | Karr | |
| 2009/0046271 A1 | 2/2009 | Constantikes | |
| 2012/0077519 A1 | 3/2012 | Suh | |
| 2012/0134307 A1 | 5/2012 | Woodward | |
| 2012/0309415 A1 * | 12/2012 | Rhoads | G01S 5/0273 |
| | | | 455/456.1 |
| 2012/0313820 A1 | 12/2012 | Tyree | |
| 2013/0051434 A1 * | 2/2013 | Draganov | G01S 19/22 |
| | | | 375/148 |
| 2014/0159961 A1 | 6/2014 | Ware | |
| 2016/0036556 A1 | 2/2016 | Liberti | |
| 2016/0306044 A1 | 10/2016 | Smits | |

* cited by examiner

GEOLOCATING WIRELESS EMITTERS

CROSS-REFERENCE TO RELATED APPLICATIONS

This application is a continuation of U.S. patent application Ser. No. 14/836,059 filed Aug. 26, 2015, entitled "Geolocating Wireless Emitters", which claims the benefit of U.S. Provisional Patent Application Ser. No. 62/042,073 filed Aug. 26, 2014, entitled "Geolocating Wireless Emitters". Each of the above applications, U.S. patent application Ser. No. 14/836,059 filed Aug. 26, 2015, entitled "Geolocating Wireless Emitters" and U.S. Provisional Patent Application Ser. No. 62/042,073 filed Aug. 26, 2014, entitled "Geolocating Wireless Emitters" is hereby incorporated by reference in its entirety.

STATEMENT REGARDING FEDERALLY SPONSORED RESEARCH OR DEVELOPMENT

The disclosed invention was made with government support under Contract No. HR011-09-C-0065 awarded by the Defense Advanced Research Projects Agency (DARPA). The government has certain rights in the invention.

FIELD OF THE INVENTION

The present invention relates to processes of geolocation in general, and specifically to geolocation processes that make use of reference signals and geolocation data to locate a target wireless emitter.

BACKGROUND

Determining the location or motion of a wireless emitter may be important in many applications; for example, military operations may need to determine the location of an enemy unit via tracking the location of a wireless emitter used by that unit. These wireless emitters may be referred to as "hostile" or "non-cooperative" emitters, as they do not intentionally broadcast geolocation information, and may be actively attempting to avoid detection. Non-cooperative emitters may also be narrow-band radio-frequency emitters, further complicating the problem of finding non-cooperative emitters. Methods and apparatuses that can locate such non-cooperative emitters may be significant in a wide range of applications.

BRIEF DESCRIPTION

The shortcomings of the prior art are overcome and additional advantages are provided through the provision, in one aspect, of a method including: obtaining at least one pair of reference channel values, a pair of target channel values, and a set of geolocation data; processing the at least one pair of reference channel values, the pair of target channel values, and the set of geolocation data to determine a phase-difference metric; and, processing the phase-difference metric to determine one or more sets of spatial location coordinates.

In another aspect, additional advantages may be provided through the provision of an apparatus including a signal processing circuit, the signal processing circuit being configured to perform a method, the method including: obtaining, from an input communications interface, at least one pair of reference channel values, a pair of target channel values, and a set of geolocation data; processing the at least one pair of reference channel values, the pair of target channel values, and the set of geolocation data to determine a phase-difference metric; and, processing the phase-difference metric to determine one or more sets of spatial location coordinates.

In another aspect, additional advantages may be provided through the provision of an apparatus including a signal processing circuit, the signal processing circuit being configured to: obtain, from a radio-frequency receiver, at least one reference signal and a target signal; process the target signal to determine a target channel value and the at least one reference signal to determine at least one reference channel value; and output, to a radio-frequency transmitter, the target channel value and the at least one reference channel value.

In another aspect, also provided is a computer program product, including one or more computer readable storage medium readable by one or more processors for execution by the one or more processors to perform a method, the method including: obtaining, from an input communications interface, at least one pair of reference channel values, a pair of target channel values, and a set of geolocation data; processing the at least one pair of reference channel values, the pair of target channel values, and the set of geolocation data to determine a phase-difference metric; and, processing the phase-difference metric to determine one or more sets of spatial location coordinates.

In yet another aspect, also provided is a system, the system including: at least one reference emitter capable of transmitting a reference signal, the at least one reference emitter having a known location; a target emitter capable of transmitting a target signal; a plurality of receiver nodes, the receiver nodes being operative to move, and the receiver nodes configured to receive the reference signal and the target signal, determine a pair of reference channel values and a pair of target channel values, and transmit the reference channel values and target channel values; and, a processing node, the processing node being configured to obtain the reference channel values and target channel values, and process the reference channel values and target channel values to determine a set of spatial location coordinates, wherein the spatial location coordinates correspond to a location of the target emitter.

Additional features and advantages are realized through the techniques disclosed herein. Other embodiments and aspects are described in detail herein and are considered a part of the claimed invention.

BRIEF DESCRIPTION OF THE DRAWINGS

One or more aspects are particularly pointed out and distinctly claimed as examples in the claims at the conclusion of the specification. The foregoing and other objects, features, and advantages are apparent from the following detailed description taken in conjunction with the accompanying drawings in which:

DETAILED DESCRIPTION

Aspects of the present invention and certain features, advantages, and details thereof, are explained more fully below with reference to the non-limiting examples illustrated in the accompanying drawings. Descriptions of well-known materials, fabrication tools, processing techniques, etc., are omitted so as not to unnecessarily obscure the invention in detail. It should be understood, however, that the detailed description and the specific examples, while indicating aspects of the invention, are given by way of illustration only, and are not by way of limitation. Various substitutions, modifications, additions, and/or arrangements, within the spirit and/or scope of the underlying inventive concepts will be apparent to those skilled in the art from this disclosure.

Figure 1A:
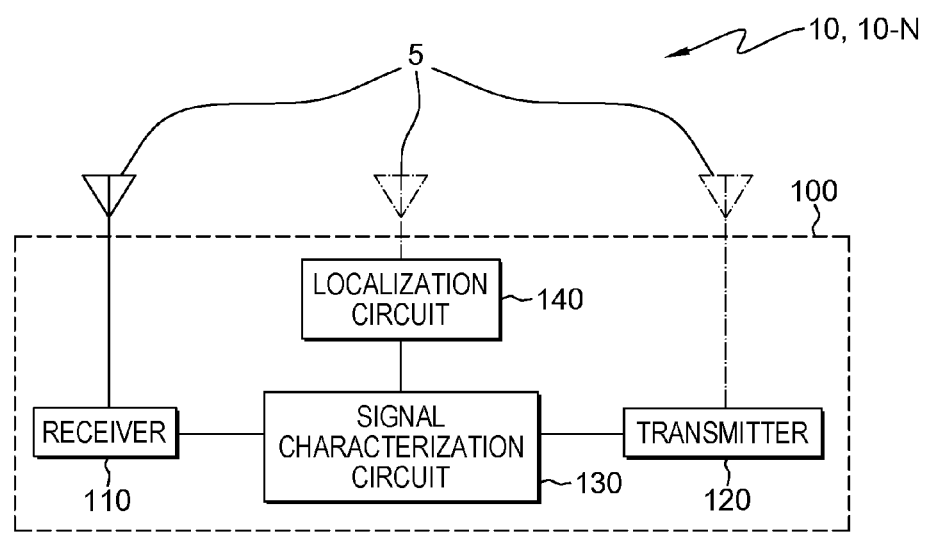
FIG. 1A is a functional block diagram of an embodiment of a signal processing circuit of a node (apparatus) capable of receiving a plurality of signals and estimating complex channel values.

FIG. 1A is a functional block diagram of an embodiment of a node (apparatus) 10, 10-N. Node 10, 10-N, generally noted as node 10, is represented specifically as nodes 10-1, 10-2, etc. in FIGS. 2A-2B. Node 10, 10-N may generally be referred to as a "receiver node," and may include a circuit, which may be signal processing circuit 100, capable of obtaining a target signal and at least one reference signal, processing the target signal to determine a target channel value and the at least one reference signal to determine at least one reference channel value, and outputting the target channel value and at least one reference channel value, in accordance with one or more aspects of the present invention. The circuit may be configured to obtain multiple signals via a radio-frequency receiver 110 (receiver), such as a target signal put out by a target wireless emitter 30 (target emitter), and at least one reference signal output by at least one reference emitter 20, as depicted in, for example, FIGS. 2A-2B. The circuit may be further configured to output, via a radio-frequency transmitter 120 (transmitter), multiple channel values, such as a target channel value (corresponding to the target signal) and at least one reference channel value (corresponding to the reference signal). Channel values, including the target channel value and the at least one reference channel value, may be determined via a signal characterization circuit 130, which may process the signals obtained from receiver 110 and output the channel values to transmitter 120. Signal processing circuit 100 may also be configured to obtain a set of geolocation data, which may be geolocation data for the node 10, 10-N, and output the set of geolocation data to transmitter 120. Signal processing circuit 100 may thus also include a localization circuit 140 configured to obtain the set of geolocation data for the node.

In one example, receiver 110 may be an oscillator-based receiver, for example, a superheterodyne receiver. Receiver 110 may handle one or more signal processing functions typically associated with superheterodyne receivers, such as signal mixing, filtering, amplification, and de-modulation of signals, in receiving one or more signals and making those signals available to signal characterization circuit 130. Similarly, in one example, transmitter 120 may be an oscillator-based transmitter, for example, a superheterodyne transmitter, and may handle one or more signal processing functions typically associated with superheterodyne transmitters, such as amplifying and filtering a signal, performing impedance matching, and modulating a carrier wave signal with a signal output by signal characterization circuit 130. In another example, antenna 5 may pick up a signal and responsively output an electrical signal received by receiver 105. Receiver 110 may be, in a simple form, a conductor coupling an antenna 5 to a signal characterization circuit 130, so that receiver 110 may receive an electrical signal via antenna 5 and conduct the electrical signal to signal characterization circuit 120. In one embodiment, receiver 110 may also amplify and filter a radio signal picked up by antenna 5. Similarly, an antenna 5 coupled to transmitter 120 may emit a signal in response to an electrical signal output from transmitter 120. Transmitter 120 may be, in a simple form, a conductor coupling cancellation signal processing circuit 120 to antenna 5, so that transmitter 120 may receive an electrical signal from signal characterization circuit 130 and transmit the electrical signal to antenna 5. In one embodiment, transmitter 120 may also amplify and/or filter a signal output by signal characterization circuit 130 prior to transmission of a signal to be emitted by antenna 5. In one embodiment transmitter 120 may modulate a carrier wave signal with a signal output by signal characterization circuit 130. It may be understood that receiver 110 and transmitter 120 need not be of similar types, and either receiver 110 or transmitter 120 may, in other embodiments, handle a portion of the functions described above, and may handle additional signal processing functions.

Signal characterization circuit 130 generally may be responsible for determining channel values for obtained signals. As described herein, channel values determined by signal characterization circuit 130 at node 10, 10-N may be processed to determine a set of spatial location coordinates, which may correspond to a location of a target emitter emitting signals that are obtained at node 10, 10-N. Signal characterization circuit 130 may obtain, from receiver 110, a target signal and at least one reference signal. Obtaining either type of signal by signal characterization circuit 130 may include, for example, obtaining a baseband signal, such as an at least one baseband reference signal and a baseband target signal, or other signal having a reduced frequency (e.g., an intermediate frequency signal) as may be output by receiver 110 which can include a representation of the corresponding carrier wave signal. Signal characterization circuit 130 may process each signal to determine a channel value corresponding to the signal, and output a target channel value (corresponding to the target signal) and at least one reference channel value (corresponding to the at least one reference signal). Processing a signal may include, for example, estimating a complex channel value for a signal based on the signal's time of arrival at receiver node 10, 10-N. In one embodiment, processing the target signal to obtain the target channel value may include extracting information about the at least one reference signal, and using the information in combination with the target signal to obtain the target channel value. Processing may also include filtering of multiple signals received by node 10, 10-N to determine a "peak" target signal and a "peak" reference signal. In one embodiment, receiver node 10, 10-N may only pick up one signal emitted by target emitter 30 or reference emitter 20, as in FIGS. 2A-2B, at any particular time. In another embodiment, such as in an environment that include numerous objects that may block or reflect signals, node 10, 10-N may receive a signal not only along a direct-line path between the receiver node 10, 10-N and the corresponding emitter, but may also receive the same signal at a different power reflected back by any number of such objects. The direct-line path may correspond to the one signal of the highest or "peak" power, out of the numerous similar signals received. Processing may also include extracting information about the at least one reference signal, and using the extracted information to adjusting a timing associated with the target signal, in order to more accurately estimate the target channel value. Signal characterization circuit 130 may also associate a time with the target channel value and at least one reference channel value. The time may correspond to the time at which the target signal and at least one reference signal arrive at node 10, 10-N. Signal characterization circuit 130 may then output the target channel value and at least one reference channel value, to transmitter 120. Signal characterization circuit 130 may output the at least one reference channel value and target channel value in the form of, for example, a signal that may be output to transmitter 120. The output signal may, in one example, be a baseband signal or other signal having a reduced frequency, such as a baseband jamming signal or a baseband feedback signal, that transmitter 110 may use to modulate a carrier wave signal.

Signal processing circuit 100 may also include a localization circuit 140. Localization circuit 140 may provide self-localization, geolocation data for node 10, 10-N. Localization circuit 140 may include, for example, a global-positioning service (GPS) unit, an inertial navigational unit, or other hardware and/or software capable of determining geolocation data for node 10, 10-N. Localization circuit 140 may be coupled with an antenna 5 to receive geolocation data. As described above, localization circuit 140 may be coupled with a shared antenna 5 that may be shared with other functional circuit blocks of signal processing circuit 100, such as receiver 110 or transmitter 120, or it may be a separate antenna 5 dedicated to localization circuit 140.

Node 10, 10-N may be configured to move over a time interval T1 to T2, during which time node 10, 10-N changes its location. Signal processing circuit 100 may obtain a first target signal and at least one first reference signal at time T1, and obtain geolocation data at time T1, and determine a first target channel value and at least one first reference channel value corresponding to time T1. Signal processing circuit 100 may then obtain a second target signal and at least one second reference signal at time T2, and obtain geolocation data at time T2, and determine a second target channel value and at least one second reference channel value corresponding to time T1. Signal processing circuit 100 may output the first target channel value and at least one first reference channel value, and subsequently output the second target channel value and at least one second reference channel value. The motion of receiver node 10, 10-N over time may be significant to determining a location of a target emitter. By determining a first set of channel values and a second set of channel values, as well as any number of additional sets of channel values determined at different times and different locations of receiver node 10, 10-N, it may be possible to accurately determine a set of spatial location coordinates, as described herein below, corresponding to a location of a target emitter.

Figure 1B:
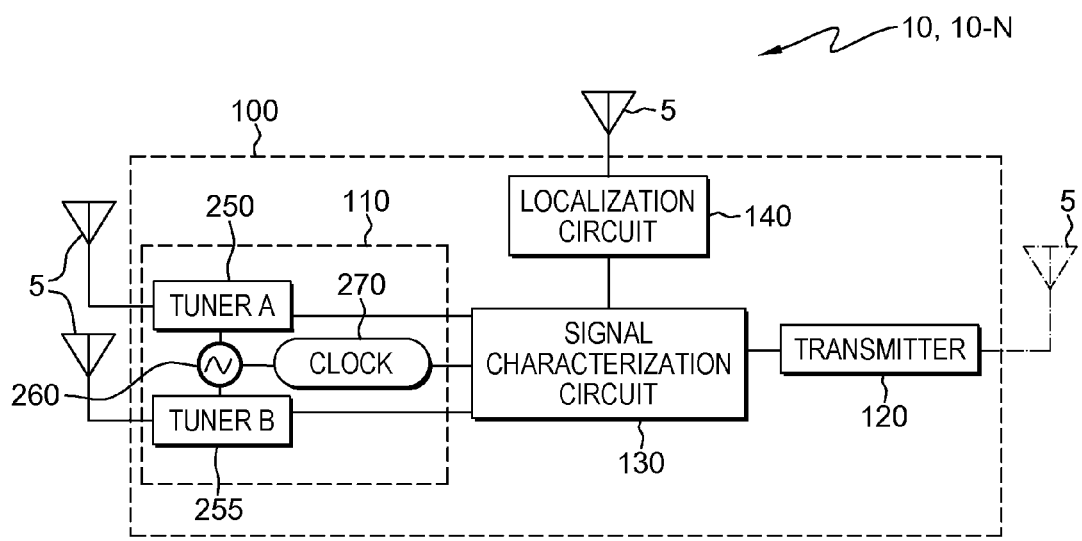
FIG. 1B depicts the functional block diagram of FIG. 1A, detailing further an exemplary embodiment of a signal processing circuit.

FIG. 1B depicts one example embodiment of a receiver node 10, 10-N including signal processing circuit 100, in which the functional block depicting receiver 110 is further detailed with additional components 250, 255, 260, and 270 to describe additional functions that signal processing circuit 100 may perform. Components 250, 255, 260, and 270 may, in one example, include hardware components corresponding to one or more parts of an analog signal processing circuit, as described further below in FIG. 1C. In another example, one or more of components 250, 255, 260, and 270 may include hardware or software components corresponding to one or more parts of a digital processing circuit, as described further below in FIG. 1C. In the example illustrated, receiver 110 may include at least a first tuner (Tuner A) 250 and may also include a second tuner (Tuner B) 255. Multiple, separate tuners may be advantageous where, for example, a target emitter and a reference emitter are transmitting signals in widely separated bandwidths, such as when the reference emitter is a wide-band signal transmitter and the target emitter is a narrow-band signal transmitter. In such cases, it may not be possible to use a single tuner 250 to receive and process both signals, and separate tuners may be used to pick up signals in each band. The separate tuners 250, 255 may be further coupled to separate antennae 5. A receiver 110 including multiple tuners 250, 255 may also include a reference oscillator 260 coupled to each tuner. Reference oscillator 260 may, for example, enforce phase locking on signals picked up at tuners 250, 255. Receiver 110 may also include a clock 270. Clock 270 may provide time data to signal characterization circuit 130 for signals received through tuners 250, 255 to mark, for example, a time of arrival of each signal received at receiver node 10, 10-N. Clock 270 may be coupled with reference oscillator 260. Signal characterization circuit 130 may obtain the signals, including a target signal and at least one reference signal, from tuners 250, 255, and may also obtain time data from clock 270.

In the example described in FIG. 1B above, localization circuit 140 may also provide a pulse reference that may be used to correct for errors arising from either clock 270, reference oscillator 260, or both. Imprecise components, such as an analog reference oscillator 260 or a common digital clock 270, may be used in a receiver 110, such as a superheterodyne receiver, as such components may be relatively inexpensive to obtain and incorporate into a signal processing circuit 100. However, such components may not be completely reliable in their output. A reference oscillator 260 set to provide a particular reference frequency may not always oscillate at the set frequency, but may vary above or below the set frequency as a result, for example, of variations in electric voltage supplied to reference oscillator 260. Reference oscillator 260 may itself be a source of variation in a phase of the output reference frequency. Similarly, a clock 270 measuring time by analog means or digital means may not precisely measure the passage of time, and may measure time slightly faster or slower than the actual passage of time; clock 270 may thus provide imprecise measures of the times at which signals are received at node 10, 10-N. The errors in a reference oscillator or clock may not be known for a particular receiver node 10, 10-N, and the magnitude of errors may vary between any pair of receiver nodes 10, 10-N. To account for and minimize the impact of errors caused by imprecise components, localization circuit 140 may provide a "pulse reference" which may be used to determine the average variation in either or both the reference oscillator 260 and clock 270. A GPS unit, for example, may provide pulses at a rate of one pulse per second, which may correspond to a rate at which the device receives data from, for example, an external localization source such as a GPS satellite. Signal characterization circuit 130 may be configured to obtain pulse reference data from localization circuit 140 along with geolocation data obtained from localization circuit 140, and signal characterization circuit may output pulse reference data to transmitter 120 in addition to other output, including, for example, the target channel value and at least one reference channel value. The pulse reference data may be correlated with a number of channel values obtained over a particular period of time in order to determine the average time error introduced by clock 270. The average time error may be used to correct one or more time values associated with output channel values, such as a target channel value or a reference channel value. Similarly, it may be possible to correlate the pulse reference provided by localization circuit 140 with the frequency output of reference oscillator 260 to determine the average frequency error or deviation added to a signal, such as a target signal or a reference signal, by the reference oscillator. Accounting for such errors in the reference oscillator 260 and clock 270 at each receiver node 10, 10-N may further increase the accuracy of phase-difference metrics that may be used to locate a target emitter 30. Correlation of the number of channel values obtained with pulse reference data, as well as correlation of the frequency output of reference oscillator 260 with pulse reference data, may be performed, in one example, at a processing node 40, as described herein below.

Figure 1C:
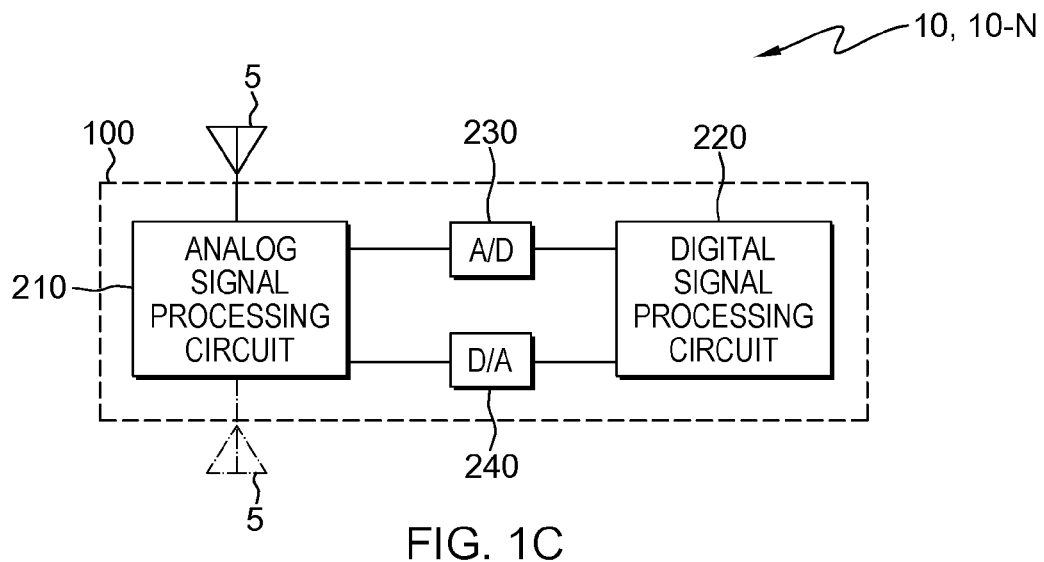
FIG. 1C is a hardware schematic diagram of an exemplary embodiment of an apparatus including a signal processing circuit.

FIG. 1C depicts a hardware schematic diagram of one embodiment of an apparatus 10, 10-N, 40 including a signal processing circuit 100, in which signal processing circuit 100 includes both a signal processing circuit in the form of an Analog Signal Processing Circuit 210 and a signal processing circuit in the form of a Digital Signal Processing Circuit 220 (DSPC). The apparatus as depicted in FIG. 1C may, in one embodiment, be a receiver node 10, 10-N, as functionally described above in FIG. 1A. The apparatus as depicted in FIG. 1C may, in another embodiment, be a node 40, as depicted in FIG. 1E. In the exemplary embodiment depicted, ASPC 210 may be configured to at least collect analog signals and make those signals available for processing, either within ASPC 210 or within DSPC 220. ASPC may include hardware components configured to perform signal processing, for example a hardware oscillator or a hardware de-modulator, but at a minimum may be capable of receiving an analog signal and passing that signal to other signal processing circuit 100 components. Regardless of what signal processing ASPC 210 performs, its output is an analog signal that may then be passed to an analog-to-digital (A/D) converter 230. The output of the A/D converter 230 may be one or more digital information signals, which may then be passed to DSPC 220. In turn, DSPC 220 may be configured to process, via one or more digital hardware or software components, the digital information signals. DSPC 220 may be configured to perform digitally any signal processing functions, such as modulation, de-modulation, filtering, amplification, and so on.

Generally, either ASPC 210 or DSPC 220, or a combination of both, may be configured to perform one or more signal characterizations. Signal characterization may include determination of channel values for obtained signals, including, for example, a target channel value for a target signal and at least one reference channel value for at least one reference signal, as described herein. Signal characterization may also include associating a time with the target channel value and the at least one reference channel value, where the time corresponds to a time at which the target signal and the at least one reference signal arrive at receiver node 10, 10-N. In the embodiment of FIG. 1C, the functions of function blocks 110, 120, 130, and/or 140 as depicted in FIG. 1A and FIG. 1B may be performed by any designed division of labor scheme between ASPC 210 and DSPC 220. Thus, in one example, DSPC 220 may be a circuit including a signal characterization circuit. In another example, DSPC 220 may be a circuit including a localization circuit.

Figure 1D:
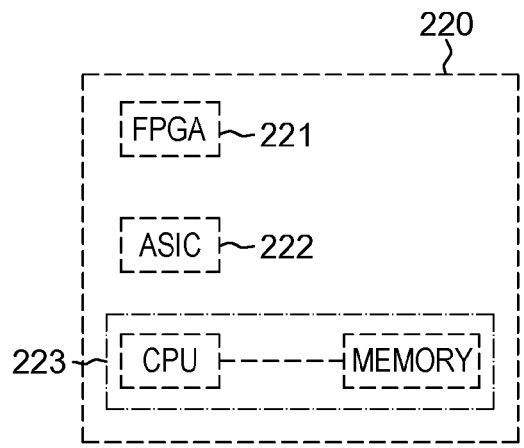
FIG. 1D depicts examples of one or more components that may be included as part of a signal processing circuit as depicted by FIG. 1C.
Figure 1E:
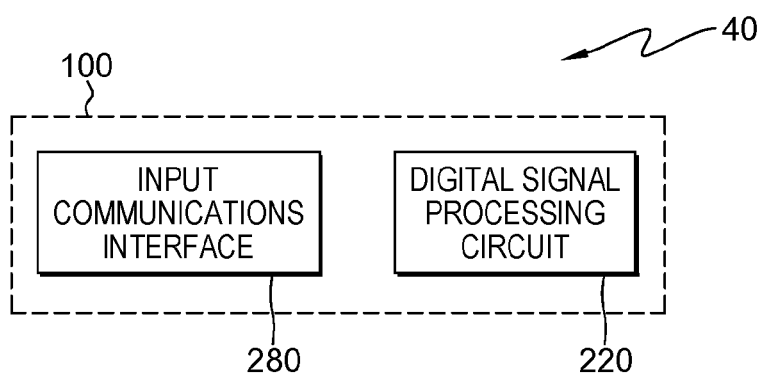
FIG. 1E is a functional block diagram of an embodiment of a processing node including a signal processing circuit capable of processing channel values to determine a set of spatial location coordinates.

FIG. 1D illustrates exemplary embodiments of a digital processing circuit 220, as may be implemented in one or more embodiments of apparatus 200 depicted in FIG. 1C. Digital signal processing circuit 220 can include, in one embodiment, one or more of a field programmable gate array (FPGA) 221, an application-specific integrated circuit (ASIC) 222, or a processor system 223 comprising a processor provided by a central processing unit (CPU) in communication with a memory, each depicted in dashed form to highlight that each is an optional component of digital signal processing circuit 220. In each case, there may be a plurality of such components present in processing circuit 220. An FPGA 221, if present, may further be coupled with a memory to allow for pre-configuration of one or more processing functions. An FPGA 221 and/or ASIC 222, if present, may include a processor system provided in the manner of a processor system 223. Digital signal processing circuit 220 may also include other circuit components external to an FPGA 221, ASIC 222, and/or processor system 223. In one embodiment, signal processing circuit 100 may include only a subset of elements, for example, signal processing circuit 100 may include one element of the elements depicted in reference to any one of FIGS. 1A-1D. In one example, such a subset of elements may be used with a legacy system having one or more remaining elements of signal processing circuit 100. Reference emitter 20, in a further embodiment, may be a node (apparatus), equipped with a radio-frequency transmitter, having one or more of the functional elements depicted in reference to FIG. 1A.

FIG. 1E is a functional block diagram depicting an embodiment of a node (apparatus) 40. Node 40 may generally be referred to as a processing node or alternatively as a "fusion node," and may include a circuit, which may be signal processing circuit 100, that may include a DSPC 220 and an input communications interface 280. In one embodiment, node 40 may be a processing system configured to obtain at least one pair of reference channel values, a pair of target channel values, and a set of geolocation data; process the at least one pair of reference channel values, the pair of target reference channel values, and the set of geolocation data to determine a phase-difference metric; and, process the phase-difference metric to determine one or more sets of spatial location coordinates. Where node 40 includes input communication interface 280, node 40 can obtain the at least one pair of reference channel values, the pair of target channel values, and the set of geolocation data from input communication interface 280. Input communication interface 280 may be a communications interface in wired or wireless communication with one or more receiver nodes 10, 10-N, and/or be in wired or wireless communication with reference node 20, so that in one embodiment input communication interface 280 obtains one or more of the at least one pair of reference channel values, the pair of target channel values, or the set of geolocation data from one or more of receiver nodes 10, 10-N and/or reference node 20. In one embodiment, DSPC 220 of signal processing circuit 100 of node 40 can include one or more of the elements as depicted for DPSC 220 in FIG. 1D. In another embodiment, signal processing circuit 100 of node 40 can include one or more elements of signal processing circuit 100 as depicted in any one of FIGS. 1A-1D. In another embodiment, node 40 may be co-located at node 10, 10-N and/or node 20. In yet another embodiment, node 40 may be external to one or more of nodes 10, 10-N, and node 20.

Figure 2A:
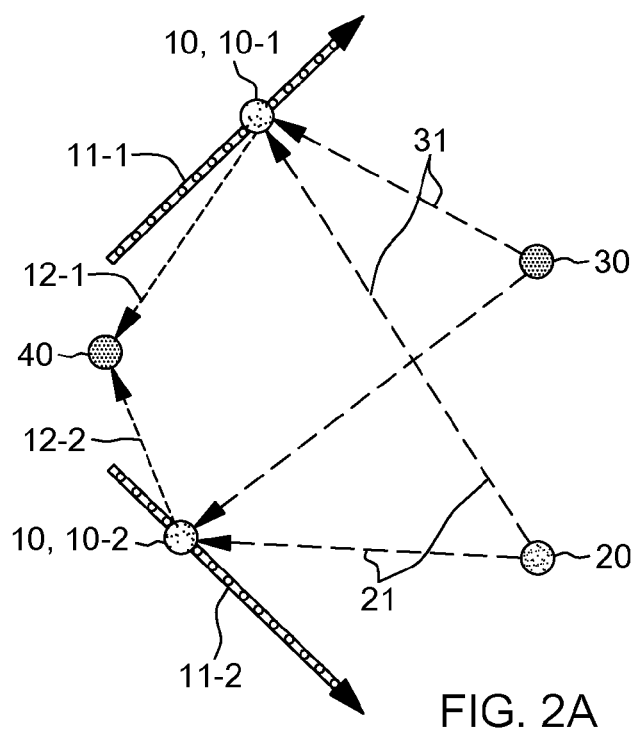
FIGS. 2A-2B depict an exemplary embodiment of a system including a plurality of receiver nodes that may be used to determine the location of a target emitter.
Figure 2B:
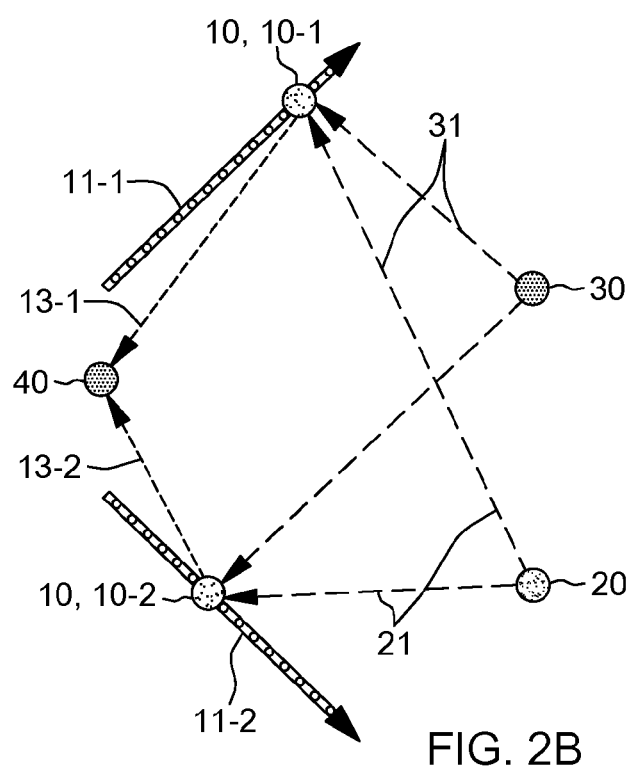

In an exemplary embodiment of a system for locating a target emitter 30, as described herein and as may be depicted in FIGS. 2A-2B, the pair of target channel values may be the target channel values determined by receiver nodes 10,10-1 and 10,10-2 for target emitter 30. Similarly, the at least one pair of reference channel values may correspond to the reference channel values determined by receiver nodes 10, 10-1 and 10,10-2 for reference emitter 20. In other exemplary embodiments, more than two receiver nodes 10, 10-N may be deployed to locate a target emitter; this may require determining multiple "pairs" of receiver nodes 10, 10-N and may result in multiple pairs of target channel values and multiple pairs of reference channel values being processed through node 40. The geolocation data may include geolocation data obtained by receiver nodes 10, 10-N, and may also include geolocation data corresponding to reference emitter 20, as well as geolocation data corresponding to multiple reference emitters if multiple reference emitters are available. In one embodiment DSPC 220 of signal processing circuit 100 of node 40 may obtain the pair of target channel values, the at least one pair of reference channel values, and the geolocation data from input communication interface 280.

Determining a phase-difference metric may include "canceling out" one or more phase variations present in any of the signals transmitted from, for example, receiver nodes 10, 10-N, a target emitter 30, and at least one reference emitter 20. Phase variations may be unknown quantities that, without cancellation, would otherwise need to be known in order to determine a phase-difference metric that may be used to determine one or more sets of spatial location coordinates for, for instance, the target emitter 30. Phase variations in the target signals may be canceled out, for example, by forming a target conjugate product between the two target channel values of the pair of target channel values. Each target channel value, as described herein above, may correspond to a target channel value determined from a target signal obtained at a receiver node 10, 10-N. Phase variations in the reference signals may similarly be canceled by forming, for example, a reference conjugate product between the two reference channel values of the at least one pair of reference channel values. Phase variations in the receiver node 10, 10-N signals may then be canceled out by determining the phase-difference metric, which may be the conjugate product between the target conjugate product and the reference conjugate product. The phase-difference metric may then be processed to determine a set of spatial location coordinates, which may correspond to a location of the target emitter 30.

The at least one pair of reference channel values may also be one pair of a plurality of pairs of reference channel values, and DSPC 220 of signal processing circuit 100 of node 40 may be further configured to process the plurality of pairs of reference channel values with the pair of target channel values and the set of geolocation data to determine the phase-difference metric. The plurality of pairs of reference channel values may correspond to a plurality of reference signals, in which each of the plurality of reference signals may be picked up by a receiver node 10, 10-N. This may be the case where, for example, a plurality of reference emitters 20 may be available to broadcast reference signals.

In another exemplary embodiment, the at least one pair of reference channel values may be an at least one first pair of reference channel values, the pair of target channel values may be a first pair of target channel value, the set of geolocation data may be a first set of geolocation data, and the phase-difference metric may be a first phase-difference metric. The at least one first pair of reference channel values, the first pair of target channel values, and the first set of geolocation data may correspond to a time T1, where T1 may be a time at which the at least one first reference signal and the first target signal were received at a receiver node 10, 10-N. DSPC 220 of signal processing circuit 100 of node 40 may thus be further configured to obtain, from input communications interface 280, at least one second pair of reference channel values, a second pair of target channel values and a second set of geolocation data; process the at least one second pair of reference channel values, the second pair of target channel values, and the second set of geolocation data to determine a second phase-difference metric; process the first phase-difference metric and the second phase-difference metric to determine a location metric; and, process the location metric to determine the one or more sets of spatial location coordinates. The second pair of target channel values, the at least one second pair of reference channel values, and the second set of geolocation data may correspond to a time T2, where T2 may be a time at which the at least one second reference signal and the second target signal were received at a receiver node 10, 10-N. Processing the first phase-difference metric and the second phase-difference metric may include, for example, forming a conjugate product of the first phase-difference metric and the second phase-difference metric to obtain the location metric. Obtaining the location metric may "cancel out" a time-dependent phase variation in the target signals and the reference signals, and may result in a location metric that may more accurately determine the set of spatial location coordinates than a single phase-difference metric may determine.

In yet another exemplary embodiment, DSPC 220 of signal processing circuit 100 of node 40 may be configured to process the one or more sets of spatial location coordinates to determine a velocity. The velocity may correspond to the speed and direction of motion of target emitter 30. Processing the one or more sets of spatial location coordinates may include carrying out multiple iterations of determining a plurality of phase differences and determining a plurality of location metrics over a period of time, during which receiver nodes 10, 10-N continue to receive target signals and reference signals at different locations along differing paths of motion and continue to transmit pairs of target channel values and pairs of reference channel values to processing node 40.

DSPC 220 of signal processing circuit 100 of node 40 may further be configured to obtain pulse reference data, via input communications interface 280, process the pulse reference data to determine an average time error, and process the average time error to correct one or more time values. The time values may be one or more time values associated with a target channel value or a reference channel value. The average time error may, for example, be an average time error of a clock 270, the clock being a clock included as part of a signal processing circuit 100 of a receiver node 10, 10-N. DSPC 220 of signal processing circuit 100 of node 40 may also be further configured to process the pulse reference data to determine an average frequency error, and process the average frequency error to correct a phase variation. The phase variation may be a phase variation in a signal, such as a target signal or an at least one reference signal, received at a receiver 10, 10-N that includes a reference oscillator 260, the phase variation being introduced into the signal by the reference oscillator 260.

As previously described above, node 40 may be co-located with apparatus 10, 10-N as depicted in FIG. 1C, and may include signal processing circuit 100 as depicted in FIG. 1C. In one embodiment, signal processing circuit 100 of node 40 may include an analog signal processing circuit 210 (ASPC) and a digital signal processing circuit 220 (DSPC). Functions of function blocks 280 and 130, as depicted in FIG. 1E, may be performed by any designed division of labor scheme between ASPC 210 and DSPC 220. In one example, ASPC 220 may be a circuit including an input communications interface 280. For instance, input communication interface 280 may include a radio-frequency receiver 110 that may be part of ASPC 210. In another embodiment, signal processing circuit 100 of node 40 may only include digital signal processing circuit 220 without including an analog signal processing circuit 210. In one example, node 40 may be an apparatus external to any of receiver nodes 10, 10-N and reference emitter 20. In another example, node 40 may be co-located with receiver node 10, 10-N, and may share one or more components of receiver node 10, 10-N, such as a signal characterization circuit 130. In yet another example, node 40 may be co-located with reference emitter 20. In another embodiment, one or more functions described as being performed by node 40 may be distributed between external nodes, for example, node 40, nodes 10, 10-N, and node 20 where nodes 40, 10, 10-N, and 20 are nodes external to one another.

FIGS. 2A-2B are illustrative schematics of a system and process for locating a target emitter 30. In FIG. 2A, a reference emitter 20 is deployed at a particular known location. A target emitter 30, whose location is unknown and for which location coordinates are to be determined, is also present. Target emitter 30 may be stationary, as depicted in FIGS. 2A-2B, or in alternative examples may be in motion, e.g., in motion on the ground, in motion in the air or in space. A first receiver node 10, 10-1 and a second receiver node 10, 10-2 are also deployed. Receiver node 10, 10-1 is in motion along path 11-1, which may be in any particular direction and speed relative to reference emitter 20 and target emitter 30. Similarly, receiver node 10, 10-2 is in motion in a different path 11-2. Receiver nodes 10, 10-1 and 10, 10-2 may be, in one example, in motion along paths 11-1, 11-2 on ground; for instance, receiver nodes 10, 10-N may be, for instance, ground-based nodes mounted on or carried in a ground vehicle capable of moving along the ground. In another example, receiver nodes 10, 10-1 and 10, 10-2 may be in motion along paths 11-1, 11-2 above ground, e.g., in the air or in space. For instance, receiver nodes 10, 10-N may be mounted on or carried in an aircraft, or may be mounted in a satellite in orbit around the earth. In exemplary embodiments receiver nodes 10, 10-N may be in common control with reference emitter 20. Reference emitter 20 can be broadcasting a reference signal 21 picked up at receiver nodes 10, 10-1 and 10, 10-2. Reference emitter 20 may, in one embodiment, be a ground-based emitter, e.g. a reference emitter with a fixed and known location. In another embodiment, reference emitter 20 may be a ground-based emitter or an air or space-based emitter that may be in motion, for which location information may be known at any time. Receiver nodes 10, 10-N pick up these signals at particular points along their respective paths of motion 11-N at a time T1. Similarly, target emitter 30 can be broadcasting a target signal 31 picked up at receiver nodes 10, 10-N at time T1.

In the example of FIGS. 2A-2B shown, for simplicity, only the direct-path signals 21, 31 between emitters 20, 30 and receiver nodes 10, 10-N are shown. It may be understood that a signal from any emitter, such as the target emitter, may be received at a receiver node 10, 10-N from multiple paths, and receiver node 10, 10-N may determine which of the multiple signal instances corresponds to the direct-path signal, as described herein above. Receiver node 10, 10-1 may process signals 31 and 21 to determine a target channel value and at least one reference channel value, and may transmit the channel values via signal 12-1 to a processing node 40. Receiver node 10, 10-1 may also transmit its own geolocation information via signal 12-1 to processing node 40. Receiver node 10, 10-2 may also similarly process signals 21 and 31 to determine a target channel value and at least one reference channel value, and transmit the channel values via signal 12-2 to an input communications interface 280 of node 40. Receiver nodes 10, 10-N thus determine a pair of target channel values, at least one pair of reference channel values, and a set of geolocation data. A signal processing circuit 100, e.g. a signal processing circuit 100 of node 40, may obtain the pair of target channel values, the at least one pair of reference channel values, and the set and geolocation data, process the pairs of channel values and set of geolocation data to determine a phase-difference metric, and process the phase-difference metric to determine one or more sets of spatial location coordinates. The spatial location coordinates may correspond to possible locations of target emitter 30. Node 40, in the embodiment illustrated by FIGS. 2A-2B, is depicted as being a separately located node from receivers 10, 10-N and reference emitter 20. It may be understood that in alternative embodiments node 40 may be co-located with any of receiver nodes 10, 10-N or reference emitter 20.

FIG. 2B depicts the system of FIG. 2A, in which receiver nodes 10, 10-N have moved over time T1 to T2, the receiver nodes 10, 10-N located at new positions at T2 along their respective paths of motion 11-N. Receiver 10, 10-1 receives reference signal 21 and target signal 31 at its new position and determines a second target channel value and at least one second reference channel value based on the new position of receiver node 10, 10-1. The second target channel value and at least one second reference channel value may be sent via signal 13-1 to node 40. Receiver node 10, 10-1 may also obtain geolocation data at this new position, and send the geolocation data with signal 13-1. Receiver 10, 10-2 similarly receives reference signal 21 and target signal 31 and sends a second target channel value and at least one second reference channel value, as described above, to processing node 40. Receiver nodes 10, 10-N thus determine a second pair of target channel values, at least one second pair of reference channel values, and a second set of geolocation data. Node 40 may process the second pair of reference channel values, the second pair of target channel values, and second set of geolocation data to determine a second phase-difference metric. Node 40 may further process the first phase-difference metric, determined in FIG. 2A, and the second phase-difference metric to determine a location metric, and process the location metric to determine a set of spatial location coordinates. The set of spatial location coordinates may correspond to a location of target emitter 30. The location metric may provide a more accurate set of spatial location coordinates for the target emitter than the one first phase-difference metric determined in FIG. 2A, as the processing of the first phase-difference and second phase-difference metrics may eliminate time-varying phase differences of signals 21, 31 output by target emitter 30 and reference emitter 20.

Figure 3:
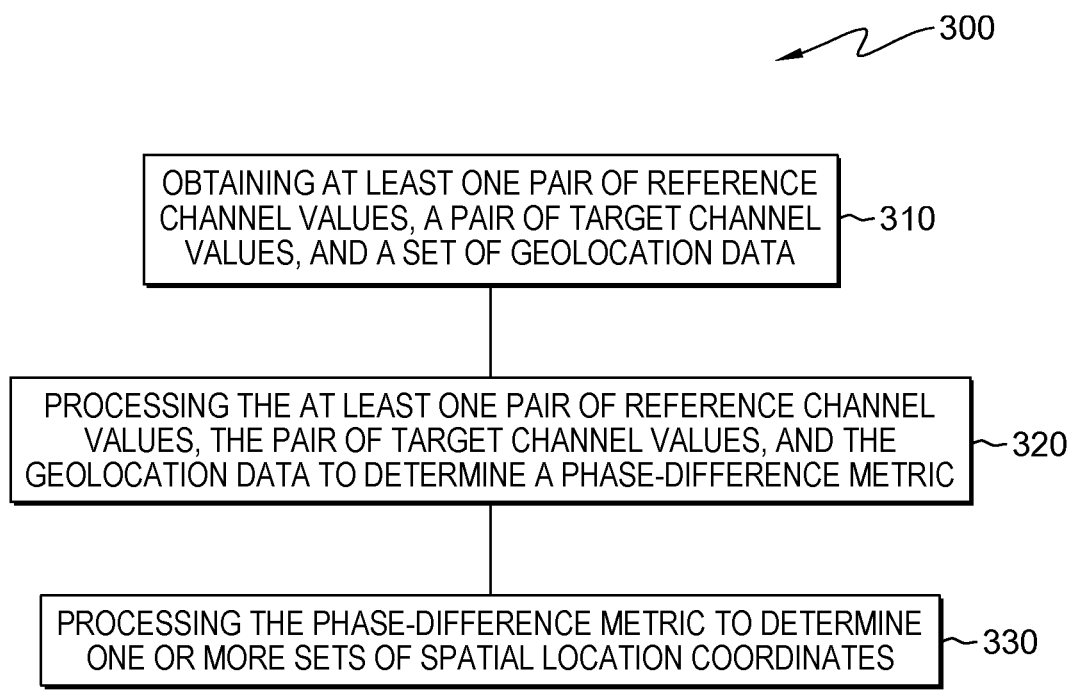
FIG. 3 is a block diagram depicting an exemplary embodiment of a method of determining a set of spatial location coordinates; and, FIG. 4 depicts one embodiment of a computer program product, in accordance with one or more aspects of the invention.

FIG. 3 is a block-diagram depicting an embodiment of a method 300 which be used to determine a set of spatial location coordinates. In one embodiment, method 300 may be performed by a signal processing circuit 100, e.g. a signal processing circuit of node 40. As described herein, the spatial location coordinates may correspond to a location of a target emitter. At least one pair of reference channel values, a pair of target channel values, and a set of geolocation data may be obtained by signal processing circuit 100 at block 310. Where signal processing circuit 100 includes input communication interface 280, DSPC 220 of signal processing circuit 100 may obtain the at least one pair of reference channel values, the pair of target channel values, and the set of geolocation data from input communication interface 280 at block 310, which has previously obtained values and data from one or more of nodes 10, 10-N, and/or 20. As described herein above, the pair of target channel values may be the target channel values determined by receiver nodes 10,10-N and the at least one pair of reference channel values may correspond to the reference channel values determined by receiver nodes 10, 10-N. The geolocation data may include geolocation data obtained by receiver nodes 10, 10-N, corresponding to locations of receiver nodes 10, 10-N, and may also include geolocation data corresponding to reference emitter 20. The at least one pair of reference channel values, pair of target channel values, and set of geolocation data may be processed by signal processing circuit 100 to determine a phase-difference metric, at block 320. The processing by signal processing circuit 100 at block 320 may include one or more of forming a target conjugate product between the two target channel values of the pair of target channel values, forming a reference conjugate product between the two reference channel values of the at least one pair of reference channel values, and forming a conjugate product between the target conjugate product and the reference conjugate product to determine the phase-difference metric. The phase-difference metric may be processed by signal processing circuit 100 to determine the set of spatial location coordinates, at block 330.

The method 300 above may include additional processing steps and obtaining additional data. In one exemplary embodiment of the above method 300 that can be performed by signal processing circuit 100, e.g. of node 40, the at least one pair of reference channel values may be an at least one first pair of reference channel values, the pair of target channel values may be a first pair of target channel value, the set of geolocation data may be a first set of geolocation data, and the phase-difference metric may be a first phase-difference metric. The method 300 may then further include obtaining at least one second pair of reference channel values, a second pair of target channel values and a second set of geolocation data; processing, by signal processing circuit 100, the at least one second pair of reference channel values, the second pair of target channel values, and the second set of geolocation data to determine a second phase-difference metric; processing, by signal processing circuit 100, the first phase-difference metric and the second phase-difference metric to determine a location metric; and, processing, by signal processing circuit 100, the location metric to determine the one or more sets of spatial location coordinates. Where signal processing circuit 100 includes input communication interface 280, DSPC 220 of signal processing circuit 100 may obtain the at least one second pair of reference channel values, the second pair of target channel values, and the second set of geolocation data from input communication interface 280. Processing the first phase-difference metric and the second phase-difference metric may include, for example, forming a conjugate product of the first phase-difference metric and the second phase-difference metric to obtain the location metric. Obtaining the location metric may "cancel out" a time-dependent phase variation in the first and second target channel values, which may correspond to the time-dependent variation in a target signal, and the first and second reference channel values, which may correspond to the time-dependent variation in the at least one reference signal.

In yet another exemplary embodiment, the method 300 may further include processing, by signal processing circuit 100, the one or more sets of spatial location coordinates to determine a velocity. The velocity may correspond to the speed and direction of motion of target emitter 30. Processing the one or more sets of spatial location coordinates may include carrying out multiple iterations of determining a plurality of phase differences and determining a plurality of location metrics over a period of time.

In one embodiment, the method 300 as set forth in FIG. 3 can be performed by and using signal processing circuitry of signal processing circuit 100 of node 40, which can be external to one or more of nodes 10, 10-N, 20 or co-located with one or more of nodes 10, 10-N, 20. In another embodiment, performance of the functions of method 300 can be distributed in accordance with a distributed processing scheme between externally disposed nodes. In the case where functions of method 300 are distributed a subset of functions of method 300 can be performed by and using signal processing circuitry of a signal processing circuit 100 of a first node, e.g. node 40, and a subset of the functions of method 300 can be performed by and using signal processing circuitry of one or more second node, e.g. node 10, 10-N, 20 which second node can be external to node 40. An apparatus for use in performance of method 300 can include signal processing circuit 100 of a single node, e.g. node 40, 10, 10-N, 20, external from one or more other nodes set forth herein. An apparatus herein can include a first apparatus (node). An apparatus herein can include a combination of nodes (apparatus) as set forth herein. An apparatus for use in performance of method 300 can include signal processing circuitry of a signal processing circuit 100 of a first node and signal processing circuitry of and external second node in the case that method 300 is performed using a distributed processing scheme. A signal processing circuit herein can include a combination of signal processing circuitry of a signal processing circuit 100 of a first node and signal processing circuit 100 of an external second node, e.g., in the case in which a distributive processing scheme is used for performance of a method, e.g. method 300.

Further details of methods for determining a set of spatial location coordinates, according to one or more embodiments described herein, as well as one or more embodiments of apparatuses and/or systems configured to determine a set of spatial location coordinates, according to one or more embodiments described herein, are set forth below.

To apply synthetic aperture phase-sensing methods, an estimate of the phase of the carrier of the signal may be obtained. For modern digital signals, this may be most readily accomplished by exploiting predictable signal components such as pilots, preambles, mid-ambles, and similar reference signals that are known in advance from the structure of the signal. As discussed further below, it is also possible to use copy-aided methods, in which the receiver node(s) 10, 10-N estimate the symbols that were transmitted on-the-fly. In either case, the receiver nodes 10, 10-N may construct a local synthetic copy of the signal as transmitted from each emitter 20, 30.

For time segment n of receive aperture m (for this discussion, different antennas on each receive node 10, 10-N each can be modeled as separate receiver nodes), the received data vector (after cancellation of higher levels signals) can be expressed as:

$$r_{m,n} = X_n a_{m,n} + n_{m,n} \quad (1)$$

where $X_n$ contains copy data for the K modeled signals incident on the aperture for the geolocation set, and $a_{m,n}$ is the set of stacked channel responses for receiver node 10, 10-N m at the specified time index n. Noise and un-modeled interference is included in $n_{m,n}$. The copy-data matrix, X has the form:

$$X_n = [X_{0,-P,n} \square, X_{0,P,n} \square, X_{K-1,-P,n} \square, X_{K-1,P,n}] \quad (2)$$

where $X_{k,p,n}$ is an $N_s \times L$ matrix containing the copy data for user k, Doppler offset p during time window n. The copy data can be obtained in a variety of ways including the use of invariant fields and exploitation of redundant data. In dense co-channel environments, non-repeated data is typically estimated using Multi-User Detection (MUD). Data that cannot be accurately estimated may be modeled as noise.

For the data received by receive node 10, 10-N m at time index n, the Maximum Likelihood estimate of the channels for the K users may be obtained using $$\hat{a}_{m,n} = (X_n^H R_{nn}^{-1} X_n)^{-1} X_n^H R_{nn}^{-1} r_{m,n} \quad (3)$$

where $R_{nn}$ is the noise covariance matrix (this can be modeled as a scaled identity matrix if the sample rate is comparable to the noise bandwidth). The joint channel estimate $\hat{a}_{m,n}$ has a form:

$$\hat{a}_{m,n} = [h_{0,m,-P,n}^T, \square, h_{0,m,P,n}^T, \square, h_{K-1,m,-P,n}^T, \square, h_{K-1,m,P,n}^T]^T \quad (2)$$

where $h_{k,m,p,n}$ is the L×1 vector channel estimate corresponding to user k, aperture m, Doppler offset p, and time window n. Together the collection of vectors $\{h_{k,m,p,n}\}$ for a given (k,m,n) tuple form the Ambiguity Function (AF) estimate as a function of delay and Doppler shift. If the signal bandwidth is sufficiently large and SNR is adequate, the first-arriving multipath component can be identified from the ambiguity function and a combination of TDOA, FDOA, and DOA methods can be used to estimate the location of user k. If the frequency offsets are chosen properly, the channel estimates for each frequency index p can be calculated independently, reducing computational complexity.

If a single signal is incident at each receiver node 10, 10-N and the length of the data set $N_s$ is too small to allow resolution of frequency-shifted components, then we can make some simplifications. If the length of the channel is assumed to be $N_c$, then $a_m$ has elements corresponding to the value of the channel at uniformly spaced delays $pT_c$ for $p=[0, N_c-1]$. We form the $N_s \times N_c$ matrix X from the known samples of the transmitted signal $x(kT_s - pT_c) = x_{k,p}$ $$X = \begin{bmatrix} x_{0,0} & x_{0,1} & \cdots & x_{0,N_c-1} \\ x_{1,0} & x_{1,1} & \cdots & x_{1,N_c-1} \\ x_{2,0} & x_{2,1} & \cdots & x_{2,N_c-1} \\ x_{3,0} & x_{3,1} & \cdots & x_{3,N_c-1} \\ \vdots & \vdots & \ddots & \vdots \\ x_{N_s-1,0} & x_{N_s-1,1} & \cdots & x_{N_s-1,N_c-1} \end{bmatrix} \quad (5)$$

$$r_m = X a_m + n_m \quad (6)$$

$$\hat{a} = (X^H R_{nn}^{-1} X)^{-1} X^H R_{nn}^{-1} r \quad (7)$$

When $R_{nn}^{-1} = \sigma_n^2 I$, this becomes:

$$\hat{a} = (X^H X)^{-1} X^H r \quad (8)$$

If the samples in $x(kT_s)$ are nearly uncorrelated, this value can be approximated by:

$$\hat{a}_p = \frac{\sum_{n=0}^{N_s-1} x_{n-p}^* r_n}{\sum_{n=0}^{N_s-1} |x_n|^2} \quad (9)$$

This may be termed the cross-correlation approach to channel estimation.

Multiple paths, or multipath, affects interferometric localization in several important ways. The Line-of-Sight (LOS) component has the information that is usable for interferometric localization. The goal is to extract the first arriving resolvable "cell". This cell may not be the strongest component, in which case, it may be necessary to take care to detect the first arriving component. A cross-correlation between the received signal and an ideal copy of what was transmitted may produce a superposition of pulses. The first cell can be resolved in different ways. For example, one may define it as the first component for which d/dt of the cross correlation amplitude is zero within ½ cell width of the first energy detected above the Constant False Alarm Rate (CFAR) threshold. If the slope of the cross correlation amplitude does not go to zero, then the first component within ½ cell of delay at which the CFAR threshold is exceeded is used.

There may be several multipath components that are unresolvable in the first cell. These components have a similar affect as noise with some important differences. First, the multipath typically scales with the LOS component, and second the multipath may or may not add coherently as the receiver node 10, 10-N moves. For example, at 900 MHz, with a speed of 1 m/s, the Doppler rate is about 3 Hz, leading to a coherence time on the order of 300 ms. For an aperture of 10 seconds, there are approximately $$N_i \approx \frac{v f_c T_{cap}}{c} \quad (10)$$

independent integration intervals, in this case 30 intervals. This means that the specular component with have a gain of approximately $10 \log_{10}(N_i)$, or 14.8 dB in this example, with respect to any multipath. Thus, if the direct-to-multipath ratio (also referred to as the Rice factor) is 0 dB measured at any single point (when $\gamma_{n,e}(t_k)$ is estimated), and the noise level is low, then the "effective" integrated direct-to-multipath ratio will be 14.8 dB.

For a similar example with a speed of 0.03 m/s, the Doppler rate is approximately 0.1 Hz, leading to a coherence time similar to the capture time. In this case, the multipath will not "de-cohere" over the capture so the integrated direct-to-multipath ratio will be equal to the raw direct-to-multipath ratio, or 0 dB in this example.

The above examples demonstrate that the specific nature of the multipath may be very important. If a multipath is temporally resolvable, and it is not the peak detected, then it will minimally impact the localization algorithm. If the multipath is not temporally resolvable from the detected path, then its effect on phase-based localization will depend on how strong it is relative to the line-of-sight path, as well as its Doppler spread. As illustrated in the examples above, even in the case of a non-resolvable multipath, and even if the Rice factor is not large, if the Doppler spread of the component is large, then the multipath component may not significantly degrade localization.

For interferometric localization to be effective, it may be important that a line-of-sight component between the emitter and several receiver nodes be present. After integration, the line-of-sight component must have a dominant contribution to the selected peak of the ambiguity function.

In the interferometric approach, the estimated complex value of the channel for the first-arriving multipath component may be denoted as $\gamma_{k,m}(nT_s)$ which is the value of the Ambiguity Function (AF) for a first arriving (presumably direct path) component. The metric $\gamma_{k,m}(nT_s)$ is equivalent to the complex channel envelope for emitter k, receive node 10, 10-N m at time index n, $$\gamma_{k,m}(nT_s) \propto h_k(nT_s) = \qquad (11)$$

$$|h_{k,0,m}(nT_s)|e^{-j\frac{2\pi d_{k,m}(nT_s)}{\lambda}} + \sum_{p=1}^{N-1} h_{k,p,m}(nT_s)e^{j2\pi f_{k,p,m} nT_s}$$

where $h_{k,p,m}(nT_s)$ is the complex amplitude of the pth multipath component for emitter k, and receiver node 10, 10-N m where $T_s$ represents the sample duration. The term $f_{k,p,m}$ represents the frequency offset of each multipath component due to Doppler. The phase of the p=0 component varies with distance $d_{k,m}(nT_s)$ and wavelength, $\lambda$. For simplicity, in the remainder of this discussion, the subscript k is omitted and the metrics are operated for one emitter at a time so that $$\gamma_{m,n} \propto h(nT_s) = |h_{0,m}(nT_s)|e^{-j\frac{2\pi d_m(nT_s)}{\lambda}} + \sum_{p=1}^{N-1} h_{p,m}(nT_s)e^{j2\pi f_{p,m} nT_s} \qquad (12)$$

The term interferometry refers to methods in which interference patterns between waves are used to extract information. The relationship between classical interferometry and phase-based localization can be understood by understanding that, via the principle of reciprocity, EQ. 12 would equally describe the narrowband complex envelope if the roles of the target emitter 30 and receiver 10, 10-N were swapped so that receiver node 10, 10-N m transmits and target emitter 30 receives. In this case, if a signal were emitted from each receiver node 10, 10-N m with conjugate of phase of the metric in EQ. 12, properly accounting for time n, and all of the waves were superimposed, the contributions from the direct path components would add constructively at the location of target. In the cases described herein, where target emitter 30 emits signals and receiver nodes 10, 10-N receive, localization is performed by measuring the quantity in EQ. 12 at each receiver node 10, 10-N m at time index k. After the data has been collected from all of the receiver nodes 10, 10-N, the system can compute where hypothetical waves launched as described in the previous paragraph would combine with maximum amplitude, indicating the location of the target. Thus, carrier-phase-based localization methods that operate in this way use interferometric concepts.

More precisely, using EQ. 12, a likelihood function can be constructed relating the metrics $\{\gamma_{m,n}\}$ to potential target emitter 30 locations (x,y,z). It may be assumed, for example, that the location of receiver node 10, 10-N m is known at each time n, and that the effects of noise, multipath, phase noise, and other receiver imperfections are modeled by the metric variance $\sigma_m^2$. If a coherent phase reference is available at all receiver nodes 10, 10-N, a likelihood function is obtained, $$L(x, y, z) = \qquad (13)$$

$$-\sum_{m=0}^{N_m-1}\sum_{n=0}^{N_n-1} \log(\pi\sigma_m^2) + \frac{1}{\sigma_m^2}|\gamma_{m,n} - \rho_{x\tilde{x}} h_{0,m,n} e^{-j2\pi d_{m,n}(x,y,z)/\lambda}|^2$$

where $\rho_{x\tilde{x}}$ represents the cross-correlation between the local synthetic copy of the signal and the received signal.

It may not always be practical to provide a coherent phase reference at different receiver nodes 10, 10-N; however, it is often reasonable to provide a coherent phase reference for different measurements along a track for a single receiver node 10, 10-N, particularly over the course of several seconds. In this case, a different likelihood expression is obtained, $$L(x, y, z) = \sum_{m=0}^{N_m-1}\left(-N_n\log(\pi\sigma_m^2) - \sum_{n=0}^{N_n-1}\frac{|\gamma_{m,n}|^2 + |\rho_{x\tilde{x}} h_{0,m,n}|^2}{\sigma_m^2}\right) + \qquad (14)$$

$$\sum_{m=0}^{N_m-1}\left(\log\left(I_0\left(\frac{2\sum_{n=0}^{N_n-1}\gamma_{m,n}\rho_{x\tilde{x}} h_{0,m,n}^* e^{-j2\pi d_{m,n}(x,y,z)/\lambda}}{\sigma_m^2}\right)\right)\right),$$

where $I_0(z)$ is the $0^{th}$ order modified Bessel function of the first kind.

The likelihood function for all of the possible target emitter 30 locations over the search space may be calculated using the estimated channel for terminal k as the collection of receiver nodes move, collecting data at different time indices n.

In practice, because the carrier frequency of the source target emitter 30 is often not well behaved, a differential metric can be used that cancels the contribution of unknown transmitter phase variation. In this case, the complex envelope is measured synchronously at multiple moving nodes. Pairs of receiver nodes are selected and differential metrics are formed:

$$\delta_{m,m',n} = \gamma_{m,n}/\gamma_{m',n} \qquad (15)$$

A metric surface can be formed using:

$$M(x, y, z) = \sum_{b=0}^{N_p-1} \delta_{m,m',n} e^{-j2\pi(d_{m,n}(x,y,z) - d_{m',n}(x,y,z))/\lambda}, \qquad (16)$$

The peak of this surface corresponds to the location of a target emitter 30.

Besides the practical constraints that complicate use of a common phase reference at different receiver nodes 10, 10-N, it may be beneficial to make selective use of coherent and non-coherent combiners. One benefit is that non-coherent combining can be used to reduce the number of nearby false peaks in the likelihood surface. The use of non-coherent combining can also widen the peak associated with the correct location estimate, allowing the search space to be sampled more coarsely, which reduces computational complexity.

It is possible to exploit a combination of delay-based methods and interferometric methods jointly. The AF approach can be used to limit the search space, and then interferometric methods can be used to improve localization accuracy. One exemplary "error model" that captures these features is illustrated below. In this model, the received signal is modeled as:

$$r_m(nT_w + kT_s) = \left( \underbrace{h_{0,m,n} e^{j2\pi f_{0,m,n}(nT_w+kT_s)} e^{-j\frac{2\pi d_{m,n}(x,y)}{\lambda}}}_{\text{Direct Path}} + \underbrace{h_{1,m,n} e^{j2\pi f_{1,m,n}(nT_w+kT_s)}}_{\text{Multipath Component}} \right) \times \underbrace{x(nT_w+kT_s) e^{j\xi_{m,n}(nT_w+kT_s)}}_{\substack{\text{Modulating} \\ \text{Signal}}} \underbrace{}_{\text{Phase Errors}} + \underbrace{n_m(nT_w+kT_s)}_{\text{Noise}} + \underbrace{I(nT_w+kT_s)}_{\text{Interference}} \quad (17)$$

The complex channel envelope can then be modeled as:

$$\gamma_{m,n} = h_{0,m,n} e^{-j2\pi d_{m,n}(x,y)/\lambda} R_{x,\tilde{x}} \Psi(f_{0,m,n} - f_{m,n}^r) e^{j(\varphi_m + \xi_{m,n})} + h_{1,m,n} R_{x,\tilde{x}} \Psi(f_{1,m,n} - f_{m,n}^r) e^{j(\varphi_m + \xi_{m,n})} + \eta_{m,n} \quad (18)$$

where:
- $h_{0,m,n}$—Complex multipath component amplitude. The direct path (p=0) is real.
- $f_{p,m,n}$—Frequency offset of the $p^{th}$ multipath component received at receiver node 10, 10-N (m,n).
- (x,y)—Location of the target emitter 30
- λ—Wavelength
- $f_{m,n}^r$—Receiver frequency offset at receiver node 10, 10-N (m,n).
- $d_{m,n}(x,y)$—Distance from target emitter 30 to receiver node 10, 10-N (m,n)
- $R_{x,\tilde{x}}$—Cross-correlation between received signal $x(nT_w+kT_s)$ and synthesized signal $\tilde{x}(nT_w+kT_s)$, $R_{x,\tilde{x}} = E[x(nT_w+kT_s) \tilde{x}^*(nT_w+kT_s)]$
- $\Psi(f_{p,m,n}-f_{m,n}^r)$—Coherence due to frequency offset:

$$\Psi(f_{p,m,n} - f_{m,n}^r) = \frac{\sin(\pi N_k T_s (f_{p,m,n} - f_{m,n}^r))}{\sin(\pi T_s (f_{p,m,n} - f_{m,n}^r))} e^{-j\pi(N_k-1)T_s(f_{p,m,n}-f_{m,n}^r)}$$

- $\varphi_m$—Phase offset of receiver node 10, 10-N m relative to other nodes
- $\tau_{m,n}$—Phase offset of receiver node 10, 10-N m at window n.
- $\eta_{m,n}$—Noise and (Gaussian-modeled) interference at receiver node 10, 10-N m at window n.

The Fisher information matrix corresponding to the likelihood function in EQ. 16 is:

$$I(x,y) = -E\left[ \sum_{m=0}^{N_m-1} \frac{1}{K_m} \frac{I_1(K_m)}{I_0(K_m)} \left(\frac{2\pi}{\lambda}\right)^2 \right. \quad (19)$$

$$\left. \sum_{n'=0}^{N_n-1} \sum_{n=0}^{N_n-1} F_{m,n} v(\theta_{m,n'})(v(\theta_{m,n}) - v(\theta_{m,n'}))^H \right]$$

where, $$F_{m,n} = \quad (20)$$

$$\text{Re}\left\{ \frac{4}{\sigma_{T,m}^4} \gamma_{m,n} \gamma_{m,n'}^* h_{0,m,n} h_{0,m,n'}^* \chi_{m,n} \chi_{m,n'}^* e^{j\frac{2\pi}{\lambda}(d_{m,n}(x,y) - d_{m,n'}(x,y))} \right\}$$

The error sources listed above are all taken into account in this expression.

$$\sigma_{T,n}^2 = 2|h_{0,m,n} \chi_{0,m,n}|^2 \sigma_{\xi,n}^2 + \sigma_{h,m}^2 |\chi_{1,m,n}|^2 + \sigma_{\eta,n}^2 \quad (21)$$

$$K_m(x,y) = \left| \frac{2}{\sigma_{T,m}^2} \sum_{n=0}^{N_n-1} \gamma_{m,n} h_{0,m,n} \chi_{0,m,n}^* e^{j2\pi d_{m,n}(x,y)/\lambda} \right| \quad (22)$$

$$v(\theta_{m,n}) = \begin{bmatrix} \cos\theta_{m,n} \\ \sin\theta_{m,n} \end{bmatrix} \quad (23)$$

Then the position error resulting from the SWCAL expression is bounded by:

$$\text{var}(x) + \text{var}(y) \geq \text{trace}(J) \quad (24)$$

where $J(x,y) = I^{-1}(x,y)$.

Interferometric localization, as described herein, presents a number of challenges in practice. First, variation of local oscillators at the emitter 30 and the receiver node 10, 10-N can complicate interferometric methods. Second, computation of the solution using the likelihood function is computationally complicated since the peak of the surface can be very narrow. As a result, if brute-force methods are used to search the likelihood surface, it may be necessary to finely grid the search area, resulting in a large number of hypothesized locations that need to be evaluated. Triple Difference Interferometry methods, as described previously and in further detail below, may overcome these challenges and problems with interferometric localization.

Referring again to FIGS. 2A and 2B, using training sequences, pilots, copy-aided methods or other techniques, it may be assumed that the channel between emitter e (20, 30), and receiver node n (10,10-1, 10,10-2) can be estimated at time $t_k$. The complex value of the first arriving path can be represented as:

$$\gamma_{n,e}(t_k) \approx \quad (25)$$

$$A_{n,e} \exp\left[ j\left( \beta_e(t_k + \delta_n) - \frac{2\pi}{\lambda_e} d_{n,e}(t_k + \delta_n) + \alpha_n(t_k + \delta_n) \right) \right] + n_{n,e}(t_k)$$

Here $A_{n,e}$ is a scalar constant, $\beta_e(t)$ is the time varying phase at emitter e (20, 30), $\alpha_n(t)$ is the time varying phase at receiver node n (10,10-1, 10,10-2), $d_{n,e}(t)$ is the time-varying distance from emitter e (20, 30) to receiver node n (10,10-1, 10,10-2), $n_{n,e}(t)$ is the noise affecting the measurement, and $\delta_n$ is the time error at receiver node n (10,10-1,

10, 10-2). To localize a target emitter 30, measurements at several pairs of receiver nodes 10, 10-N may be required. The conjugate product between measurements at two different receiver nodes (effectively the difference in phases) is:

$$\hat{\delta}_{n_1,n_2,e_1}(t_k) = \hat{\gamma}_{n_1,e_1}(t_k) \cdot \hat{\gamma}^*_{n_2,e_1}(t_k) \quad (26)$$

$$= A_{n_1,e_1,s} A_{n_2,e_1,s} \exp\left[j\left(\beta_{e_1}(t_k + \delta_{n_1}) - \beta_{e_1}(t_k + \delta_{n_2}) - \frac{2\pi}{\lambda_{e_1}}(d_{n_1,e_1}(t_k + \delta_{n_1}) - d_{n_2,e_1}(t_k + \delta_{n_2}))\right)\right] \times \exp[j(\alpha_{n_1}(t_k + \delta_{n_1}) - \alpha_{n_2}(t_k + \delta_{n_2}))]$$

$$\approx K \exp\left[j\left(\beta_{e_1}(t_k) - \beta_{e_1}(t_k) - \frac{2\pi}{\lambda_{e_1}}(d_{n_1,e_1}(t_k + \delta_{n_1}) - d_{n_2,e_1}(t_k + \delta_{n_2})) + \alpha_{n_1}(t_k + \delta_{n_1}) - \alpha_{n_2}(t_k + \delta_{n_2})\right)\right]$$

$$= K \exp\left[j\left(-\frac{2\pi}{\lambda_{e_1}}(d_{n_1,e_1}(t_k - \delta_{n_1}) - d_{n_2,e_1}(t_k + \delta_{n_2})) + \alpha_{n_1}(t_k + \delta_{n_1}) - \alpha_{n_2}(t_k + \delta_{n_2})\right)\right]$$

In EQ. 26 it is assumed that $d\beta_{e_1}/dt \ll (2\pi|\delta_{n_1} - \delta_{n_2}|)$. This step effectively removes the effect of transmitter 20, 30 frequency offset from the metric. This assumption introduces requires on the time alignment between receiver nodes $n_1$ (10, 10-1) and $n_2$ (10, 10-2) based on the expected phase variation at the emitter 20, 30.

Next, another ratio, the second phase difference, is formed:

$$\hat{\rho}_{n_1,n_2,e_1,e_2}(t_k) = \hat{\delta}_{n_1,n_2,e_1}(t_k) \cdot \hat{\delta}^*_{n_1,n_2,e_2}(t_k) \approx \quad (27)$$

$$A_{n_1,e_1} A_{n_2,e_1} \exp\left[j\left(-\frac{2\pi}{\lambda_{e_1}}(d_{n_1,e_1}(t_k + \delta_{n_1}) - d_{n_2,e_1}(t_k + \delta_{n_2})) + \alpha_{n_1}(t_k + \delta_{n_1}) - \alpha_{n_2}(t_k + \delta_{n_2})\right)\right] \times A_{n_1,e_2} A_{n_2,e_2}$$

$$\exp\left[-j\left(-\frac{2\pi}{\lambda_{e_2}}(d_{n_1,e_2}(t_k + \delta_{n_1}) - d_{n_2,e_2}(t_k + \delta_{n_2})) + \alpha_{n_1}(t_k + \delta_{n_1}) - \alpha_{n_2}(t_k + \delta_{n_2})\right)\right] \approx$$

$$K \exp\left[-j\left(\frac{2\pi}{\lambda_{e_1}}(d_{n_1,e_1}(t_k + \delta_{n_1}) - d_{n_2,e_1}(t_k + \delta_{n_2})) - \frac{2\pi}{\lambda_{e_2}}(d_{n_1,e_2}(t_k + \delta_{n_1}) - d_{n_2,e_2}(t_k + \delta_{n_2}))\right)\right]$$

If $\partial(d_{n,e}(t))/\partial t \ll \lambda_e / 2\pi |\delta_{n_1} - \delta_{n_2}|^{-1}$, then $$\hat{\rho}_{n_1,n_2,e_1,e_2}(t_k) = \quad (28)$$

$$K \exp\left[-j\left(\frac{2\pi}{\lambda_{e_1}}(d_{n_1,e_1}(t_k) - d_{n_2,e_1}(t_k)) - \frac{2\pi}{\lambda_{e_2}}(d_{n_1,e_2}(t_k) - d_{n_2,e_2}(t_k))\right)\right]$$

If the location of reference emitter $e_2$ (20) and the location of each receiver node (10, 10-N) are known, a corrected value $\hat{\rho}^c_{n_1,n_2,e_1}(t_k)$ may be formed:

$$\hat{\rho}^c_{n_1,n_2,e_1}(t_k) = \hat{\rho}_{n_1,n_2,e_1,e_2}(t_k) \cdot \exp\left[-j\frac{2\pi}{\lambda_{e_2}}(\hat{d}_{n_1,e_2}(t_k) - \hat{d}_{n_2,e_2}(t_k))\right] \quad (29)$$

$$\approx K \exp\left[-j\frac{2\pi}{\lambda_{e_1}}(d_{n_1,e_1}(t_k) - d_{n_2,e_1}(t_k)) + \frac{2\pi}{\lambda_{e_2}}(d_{n_1,e_2}(t_k) - d_{n_2,e_2}(t_k))\right] \times$$

$$\exp\left[j\left(-\frac{2\pi}{\lambda_{e_2}}(\hat{d}_{n_1,e_2}(t_k) - \hat{d}_{n_2,e_2}(t_k))\right)\right]$$

$$\approx K \exp\left[-j\frac{2\pi}{\lambda_{e_1}}(d_{n_1,e_1}(t_k) - d_{n_2,e_1}(t_k))\right]$$

This quantity, which may be called a double-difference metric or phase-difference metric can be used to locate target emitter $e_1$ (30). However, the error performance surface associated with this quantity has many local minima and the correct peak is very narrow, making it challenging to search.

To control the shape of the error surface to simplify the search process, a further value may be formed, called the third phase difference or location metric, by forming the conjugate product between values of $\hat{\rho}_{n_1,n_2,e_1,e_2}(t_k)$ at two points in time:

$$\hat{\eta}_{n_1,n_2,e_1,e_2}(t_k, t_{k-L}) = \hat{\rho}_{n_1,n_2,e_1,e_2}(t_k) \cdot \hat{\rho}^*_{n_1,n_2,e_1,e_2}(t_{k-L}) \quad (30)$$

$$= K \exp\left[-j\frac{2\pi}{\lambda_{e_1}}(d_{n_1,e_1}(t_k) - d_{n_2,e_1}(t_k)) + j\frac{2\pi}{\lambda_{e_2}}(d_{n_1,e_2}(t_k) - d_{n_2,e_2}(t_k))\right] \times$$

$$\exp\left[j\frac{2\pi}{\lambda_{e_1}}(d_{n_1,e_1}(t_{k-L}) - d_{n_2,e_1}(t_{k-L})) - j\frac{2\pi}{\lambda_{e_2}}(d_{n_1,e_2}(t_{k-L}) - d_{n_2,e_2}(t_{k-L}))\right]$$

For two-dimensional receiver node 10, 10-N motion in the x-y plane, if the source is in the far field of each receiver node track 11-1, 11-2, for a duration $t_k - t_{k-L}$, and the receiver nodes 10, 10-N travel in straight lines, this quantity may be approximated with:

$$\hat{\eta}_{n_1,n_2,e_1,e_2}(t_k, t_{k-L}) \approx K \exp\left[-j2\pi LT_s\left(v_{x,n_1}\left(\frac{\cos\theta_{n_1,e_1}}{\lambda_{e_1}} - \frac{\cos\theta_{n_1,e_2}}{\lambda_{e_2}}\right) + v_{y,n_1}\left(\frac{\sin\theta_{n_1,e_1}}{\lambda_{e_1}} - \frac{\sin\theta_{n_1,e_2}}{\lambda_{e_2}}\right)\right)\right] \times \quad (31)$$

$$\exp\left[j2\pi LT_s\left(v_{x,n_2}\left(\frac{\cos\theta_{n_2,e_1}}{\lambda_{e_1}} - \frac{\cos\theta_{n_2,e_2}}{\lambda_{e_2}}\right) + v_{y,n_2}\left(\frac{\sin\theta_{n_2,e_1}}{\lambda_{e_1}} - \frac{\sin\theta_{n_2,e_2}}{\lambda_{e_2}}\right)\right)\right]$$

where $v_{x,n}$ and $v_{y,n}$ are the velocity components of receiver node n (10, 10-N) in the x and y directions and $\theta_{n,e}$ is the direction to emitter e (20, 30) from receiver node n (10, 10-N), measured from the x-axis. This simplification highlights the relationship between TDI approaches and Frequency Difference of Arrival (FDOA) methods.

As performed previously when calculating $\hat{\rho}_{n_1,n_2,e_1}^{c}(t_k)$, a version of the location metric may be formed that removes the dependency on the reference emitter (20) location:

$$\hat{\eta}_{n_1,n_2,e_1}^{c}(t_k, t_{k-L}) = \hat{\rho}_{n_1,n_2,e_1}^{c}(t_k) \times \hat{\rho}_{n_1,n_2,e_1}^{c*}(t_{k-L}) \quad (32)$$

$$\approx K \exp\left[-j\frac{2\pi}{\lambda_{e_1}}(d_{n_1,e_1}(t_k) - d_{n_2,e_1}(t_k))\right] \times$$

$$\exp\left[j\frac{2\pi}{\lambda_{e_1}}(d_{n_1,e_1}(t_{k-L}) - d_{n_2,e_1}(t_{k-L}))\right]$$

$$= K \exp\left[-j\frac{2\pi}{\lambda_{e_1}}(d_{n_1,e_1}(t_k) - d_{n_2,e_1}(t_k) - d_{n_1,e_1}(t_{k-L}) + d_{n_2,e_1}(t_{k-L}))\right]$$

As before, the far-field simplification may be computed as:

$$\hat{\eta}_{n_1,n_2,e_1}^{c}(t_k, t_{k-L}) = K \exp\left[-j\frac{2\pi}{\lambda_{e_1}}(d_{n_1,e_1}(t_k) - d_{n_2,e_1}(t_k))\right] \times \quad (33)$$

$$\exp\left[j\frac{2\pi}{\lambda_{e_1}}(d_{n_1,e_1}(t_{k-L}) - d_{n_2,e_1}(t_{k-L}))\right]$$

$$\approx K \exp\left[-j2\pi LT_s\left(v_{x,n_1}\left(\frac{\cos\theta_{n_1,e_1}}{\lambda_{e_1}}\right) + v_{y,n_1}\left(\frac{\sin\theta_{n_1,e_1}}{\lambda_{e_1}}\right)\right)\right] \times$$

$$\exp\left[j2\pi LT_s\left(v_{x,n_2}\left(\frac{\cos\theta_{n_2,e_1}}{\lambda_{e_1}}\right) + v_{y,n_2}\left(\frac{\sin\theta_{n_2,e_1}}{\lambda_{e_1}}\right)\right)\right]$$

The triple difference metric of EQ. 32 may be expressed as a function of the unknown target emitter (30) location:

$$\hat{\eta}_{n_1,n_2,e}^{c}(t_k, t_{k-L}) = f_m(x_e, y_e, z_e) = f_m(w) \quad (34)$$

where $w = [x_e \ y_e \ z_e]^T$. The measurements $\rho_{n_1,n_2,e}^{c}(t_k, t_{k-L})$ may be "stacked" for all values of k and selected pairs $\{n_1, n_2\}$ in a vector h where $h = f(w) + n$.

$$f(w) = \begin{bmatrix} f_0(w) \\ \vdots \\ f_{N_m-1}(w) \end{bmatrix} \quad (35)$$

In other words, the $m^{th}$ row of h contains the pair-wise measurements corresponding to pair $\{n_1, n_2\}$ for time samples $t_k$ and $t_{k-L}$.

Given an initial estimate of the location for emitter e, $w_0 = [x_0 \ y_0 \ z_0]^T$, the function of the correct location may be expressed using the first two terms of the Taylor series:

$$f(w) = f(w_0) + G(w_0)(w - w_0) \quad (36)$$

and $G(w_0)$ is $$G(w_0) = \begin{bmatrix} \frac{\partial f_0(w)}{\partial w_0} & \cdots & \frac{\partial f_0(w)}{\partial w_{N_w-1}} \\ \vdots & & \vdots \\ \frac{\partial f_{N_m-1}(w)}{\partial w_0} & \cdots & \frac{\partial f_{N_m-1}(w)}{\partial w_{N_w-1}} \end{bmatrix}\bigg|_{w=w_0} \quad (37)$$

$$\frac{\partial f_m(w)}{\partial x_e}\bigg|_{w=w_0} = \quad (38)$$

$$\frac{\partial \hat{\eta}_{n_1,n_2,e}^{C}(w)}{\partial x_e}\bigg|_{w=w_0} = j\frac{2\pi K}{\lambda_e}\left[\frac{x_{n_1}(t_k) - x_0}{\hat{d}_{n_1,e}(t_k)} - \frac{x_{n_2}(t_k) - x_0}{\hat{d}_{n_2,e}(t_k)} - \right.$$

$$\left.\frac{x_{n_1}(t_{k-L}) - x_0}{\hat{d}_{n_1,e}(t_{k-L})} + \frac{x_{n_2}(t_{k-L}) - x_0}{\hat{d}_{n_2,e}(t_{k-L})}\right]\hat{\eta}_{n_1,n_2,e}^{C}(w_0)$$

$$\frac{\partial f_m(w)}{\partial y_e}\bigg|_{w=w_0} = \quad (39)$$

$$\frac{\partial \hat{\eta}_{n_1,n_2,e}^{C}(w)}{\partial y_e}\bigg|_{w=w_0} = j\frac{2\pi K}{\lambda_e}\left[\frac{y_{n_1}(t_k) - y_0}{\hat{d}_{n_1,e}(t_k)} - \frac{y_{n_2}(t_k) - y_0}{\hat{d}_{n_2,e}(t_k)} - \right.$$

$$\left.\frac{y_{n_1}(t_{k-L}) - y_0}{\hat{d}_{n_1,e}(t_{k-L})} + \frac{y_{n_2}(t_{k-L}) - y_0}{\hat{d}_{n_2,e}(t_{k-L})}\right]\hat{\eta}_{n_1,n_2,e}^{C}(w_0)$$

$$\frac{\partial f_m(w)}{\partial z_e}\bigg|_{w=w_0} = \quad (40)$$

$$\frac{\partial \hat{\eta}_{n_1,n_2,e}^{C}(w)}{\partial z_e}\bigg|_{w=w_0} = j\frac{2\pi K}{\lambda_e}\left[\frac{z_{n_1}(t_k) - z_0}{\hat{d}_{n_1,e}(t_k)} - \frac{z_{n_2}(t_k) - z_0}{\hat{d}_{n_2,e}(t_k)} - \right.$$

$$\left.\frac{z_{n_1}(t_{k-L}) - z_0}{\hat{d}_{n_1,e}(t_{k-L})} + \frac{z_{n_2}(t_{k-L}) - z_0}{\hat{d}_{n_2,e}(t_{k-L})}\right]\hat{\eta}_{n_1,n_2,e}^{C}(w_0)$$

where $\hat{d}_{n,e}(t)$ is computed at $w_0$.

A cost function is formed from the squared error between the measured values and the modeled values:

$$J(w) = \|h - f(w)\|^2 \quad (41)$$

And solving for $\nabla_w J(w) = 0$ gives:

$$\hat{w} = w_0 + (G(w_0)^H G(w_0))^{-1} G(w_0)^H (h - f(w_0)) \quad (42)$$

If the target emitter 30 is moving during the period of measurements, it is possible to extend the model to handle this case $w = [x_e \ y_e \ z_e \ v_{xe} \ v_{ye} \ v_{ze}]^T$. With $w_0 = [x_0 \ y_0 \ z_0 \ v_{x0} \ v_{y0} \ v_{z0}]^T$, $$\frac{\partial f_m(w)}{\partial x_e}\bigg|_{w=w_0} = \frac{\partial \hat{\eta}_{n_1,n_2,e}^{C}(w)}{\partial x_e}\bigg|_{w=w_0} = \quad (43)$$

$$j\frac{2\pi K}{\lambda_e}\left[\frac{x_{n_1}(t_k) - x_0 - v_{x0}t_k}{\hat{d}_{n_1,e}(t_k)} - \frac{x_{n_2}(t_k) - x_0 - v_{x0}t_k}{\hat{d}_{n_2,e}(t_k)} - \right.$$

$$\frac{x_{n_1}(t_{k-L}) - x_0 - v_{x0}t_{k-L}}{\hat{d}_{n_1,e}(t_{k-L})} +$$

$$\left.\frac{x_{n_2}(t_{k-L}) - x_0 - v_{x0}t_{k-L}}{\hat{d}_{n_2,e}(t_{k-L})}\right]\hat{\eta}_{n_1,n_2,e}^{C}(w_0)$$

$$\frac{\partial f_m(w)}{\partial y_e}\bigg|_{w=w_0} = \frac{\partial \hat{\eta}_{n_1,n_2,e}^{C}(w)}{\partial y_e}\bigg|_{w=w_0} = \quad (44)$$

-continued $$j\frac{2\pi K}{\lambda_e}\left[\frac{y_{n_1}(t_k)-y_0-v_{y0}t_k}{\hat{d}_{n_1,e}(t_k)}-\frac{y_{n_2}(t_k)-y_0-v_{y0}t_k}{\hat{d}_{n_2,e}(t_k)}-\right.$$

$$\frac{y_{n_1}(t_{k-L})-y_0-v_{y0}t_{k-L}}{\hat{d}_{n_1,e}(t_{k-L})}+$$

$$\left.\frac{y_{n_2}(t_{k-L})-y_0-v_{y0}t_{k-L}}{\hat{d}_{n_2,e}(t_{k-L})}\right]\hat{\eta}^C_{n_1,n_2,e}(w_0)$$

$$\left.\frac{\partial f_m(w)}{\partial z_e}\right|_{w=w_0}=\left.\frac{\partial \hat{\eta}^C_{n_1,n_2,e}(w)}{\partial z_e}\right|_{w=w_0}= \tag{45}$$

$$j\frac{2\pi K}{\lambda_e}\left[\frac{z_{n_1}(t_k)-z_0-v_{z0}t_k}{\hat{d}_{n_1,e}(t_k)}-\frac{z_{n_2}(t_k)-z_0-v_{z0}t_k}{\hat{d}_{n_2,e}(t_k)}-\right.$$

$$\frac{z_{n_1}(t_{k-L})-z_0-v_{z0}t_{k-L}}{\hat{d}_{n_1,e}(t_{k-L})}+$$

$$\left.\frac{z_{n_2}(t_{k-L})-z_0-v_{z0}t_{k-L}}{\hat{d}_{n_2,e}(t_{k-L})}\right]\hat{\eta}^C_{n_1,n_2,e}(w_0)$$

$$\left.\frac{\partial f_m(w)}{\partial v_{xe}}\right|_{w=w_0}=\left.\frac{\partial \hat{\eta}^C_{n_1,n_2,e}(w)}{\partial v_{xe}}\right|_{w=w_0}= \tag{46}$$

$$j\frac{2\pi K}{\lambda_e}\left[t_k\frac{x_{n_1}(t_k)-x_0-v_{x0}t_k}{\hat{d}_{n_1,e}(t_k)}-t_k\frac{x_{n_2}(t_k)-x_0-v_{x0}t_k}{\hat{d}_{n_2,e}(t_k)}-\right.$$

$$t_{k-L}\frac{x_{n_1}(t_{k-L})-x_0-v_{x0}t_{k-L}}{\hat{d}_{n_1,e}(t_{k-L})}+$$

$$\left.t_{k-L}\frac{x_{n_2}(t_{k-L})-x_0-v_{x0}t_{k-L}}{\hat{d}_{n_2,e}(t_{k-L})}\right]\hat{\eta}^C_{n_1,n_2,e}(w_0)$$

$$\left.\frac{\partial f_m(w)}{\partial v_{ye}}\right|_{w=w_0}=\left.\frac{\partial \hat{\eta}^C_{n_1,n_2,e}(w)}{\partial v_{ye}}\right|_{w=w_0}= \tag{47}$$

$$j\frac{2\pi K}{\lambda_e}\left[t_k\frac{y_{n_1}(t_k)-y_0-v_{y0}t_k}{\hat{d}_{n_1,e}(t_k)}-t_k\frac{y_{n_2}(t_k)-y_0-v_{y0}t_k}{\hat{d}_{n_2,e}(t_k)}-\right.$$

$$t_{k-L}\frac{y_{n_1}(t_{k-L})-y_0-v_{y0}t_{k-L}}{\hat{d}_{n_1,e}(t_{k-L})}+$$

$$\left.t_{k-L}\frac{y_{n_2}(t_{k-L})-y_0-v_{y0}t_{k-L}}{\hat{d}_{n_2,e}(t_{k-L})}\right]\hat{\eta}^C_{n_1,n_2,e}(w_0)$$

$$\left.\frac{\partial f_m(w)}{\partial v_{ze}}\right|_{w=w_0}=\left.\frac{\partial \hat{\eta}^C_{n_1,n_2,e}(w)}{\partial v_{ze}}\right|_{w=w_0}= \tag{48}$$

$$j\frac{2\pi K}{\lambda_e}\left[t_k\frac{z_{n_1}(t_k)-z_0-v_{z0}t_k}{\hat{d}_{n_1,e}(t_k)}-t_k\frac{z_{n_2}(t_k)-z_0-v_{z0}t_k}{\hat{d}_{n_2,e}(t_k)}-\right.$$

$$t_{k-L}\frac{z_{n_1}(t_{k-L})-z_0-v_{z0}t_{k-L}}{\hat{d}_{n_1,e}(t_{k-L})}+$$

$$\left.t_{k-L}\frac{z_{n_2}(t_{k-L})-z_0-v_{z0}t_{k-L}}{\hat{d}_{n_2,e}(t_{k-L})}\right]\hat{\eta}^C_{n_1,n_2,e}(w_0)$$

These values are substituted into EQ. 37 and EQ. 42 to solve for the target emitter 30 parameters.

The mean value of the solution computed using EQ. 42 is:

$$\begin{aligned}E[\hat{w}]&=E[W_0+(G^HG)^{-1}G^H(h-f(w_0))]\\&=E[w_0+(G^HG)^{-1}G^H(G(w-w_0)+n)]\\&=E[w+(G^HG)^{-1}G^Hn]\\&=w+(G^HG)^{-1}G^HE[n]\\&=w\end{aligned} \tag{49}$$

The error covariance can be computed using:

$$\begin{aligned}P&=E[(\hat{w}-w)(\hat{w}-w)^H]\\&=E[(G^HG)^{-1}G^Hnn^HG(G^HG)^{-1}]\\&=(G^HG)^{-1}G^HNG(G^HG)^{-1}\end{aligned} \tag{50}$$

where $N=E[nn^H]$.

Depending on the set of variables selected for the w, the solution can be found in two or three dimensions, and for stationary or moving target emitters 30 as discussed above. If $w=[x\ y]^T$, then the covariance matrix can be interpreted as providing information about the error ellipse. If the eigenvalues of P are $\{\lambda_n\}$, then the major and minor axes of the error ellipse are $$\begin{aligned}m_0&=\sqrt{-2\ln(1-P_e)\lambda_{max}}\\m_1&=\sqrt{-2\ln(1-P_e)\lambda_{min}}\end{aligned} \tag{51}$$

And the rotation of the error ellipse is:

$$\theta=\begin{cases}\frac{1}{2}\tan^{-1}\left(\frac{2P_{1,2}}{P_{1,1}-P_{2,2}}\right) & P_{2,2}\leq P_{1,1}\\ \frac{1}{2}\tan^{-1}\left(\frac{2P_{1,2}}{P_{1,1}-P_{2,2}}\right)-\pi/2 & P_{2,2}>P_{1,1}\end{cases} \tag{52}$$

Referring again to FIG. 1B and FIGS. 2A-2B, in embodiments in which a receiver node 10, 10-N includes at least a first tuner 250 a second tuner 255, and where a target emitter 30 and a reference emitter 20 are transmitting signals in widely separated bandwidths, such as when the reference emitter is a wide-band signal transmitter and the target emitter is a narrow-band signal transmitter. As previously described, it may not be possible to use a single tuner to receive and process both signals, and separate tuners may be used to pick up signals in each band. For any one tuner, with respect to measurements of reference emitter 20, EQ. 26 may be written as:

$$\hat{\delta}_{n_1,n_2,e_2,A}(t_k) = \qquad (53)$$

$$K \exp\left[j\left(-\frac{2\pi}{\lambda_{e_2}}(d_{n_1,e_2}(t_k) - d_{n_2,e_2}(t_k)) + \alpha_{n_1,A}(t_k) - \alpha_{n_2,A}(t_k)\right)\right]$$

where the notation is extended to indicate that the measurements were made on a particular tuner, such as first tuner 250. Since the reference emitter is at a known location, the following can be formed:

$$\hat{\delta}^C_{n_1,n_2,e_2,A}(t_k) = \hat{\delta}_{n_1,n_2,e_2,A}(t_k) \cdot \qquad (54)$$

$$\exp\left[j\frac{2\pi}{\lambda_{e_1}}(\hat{d}_{n_1,e_2}(t_k) - \hat{d}_{n_2,e_2}(t_k))\right]$$

$$\approx K \ \exp\left[j(\alpha_{n_1,A}(t_k) - \alpha_{n_2,A}(t_k))\right]$$

The measurement of the target emitter 30 on the tuner is:

$$\hat{\delta}_{n_1,n_2,e_2,B}(t_k) = \qquad (55)$$

$$K \exp\left[j\left(-\frac{2\pi}{\lambda_{e_1}}(d_{n_1,e_1}(t_k) - d_{n_2,e_1}(t_k)) + \alpha_{n_1,B}(t_k) - \alpha_{n_2,B}(t_k)\right)\right]$$

It may be assumed that each tuner is phase-locked to the reference oscillator 260. Then the instantaneous RF phase of the local oscillator for tuner s is modeled as:

$$\psi_s(t) = \frac{f_{c,s}}{f_{ref}} \times \psi_{ref}(t) \qquad (56)$$

where $f_{c,s}$ is the center frequency for tuner s.

Based on the model in EQ. 56 the measured residual phase on first tuner 250 can be measured to estimate the residual phase on second tuner 255 due to the reference oscillator and remove its effect. After performing this correction, the remaining phase variation on second tuner 255 is $$\Delta\psi_B(t) = \psi_B(t) - \frac{f_{c,B}}{f_{c,A}} \times \psi_A(t) \qquad (57)$$

For the measurements above, after computing this difference, the mean residual phase slope of $\Delta\psi_B(t)$ is less than $10^{-4}$ Hz for both of the radios. This suggests that a major contributor to the residual phase variation on each slice is due to the reference oscillator 260, and that the phase measurements from first tuner 250 can be used to characterize and remove the residual phase variation on second tuner 255.

A modified version of the metric given by EQ. 27 may be formed:

$$\hat{\rho}^C_{n_1,n_2,e_1}(t_k) = \hat{\delta}_{n_1,n_2,e_1,B}(t_k) \cdot \left(\hat{\delta}^{C*}_{n_1,n_2,e_2,A}(t_k)\right)^{f_B/f_A} \qquad (58)$$

$$\approx K \exp\left[j\left(-\frac{2\pi}{\lambda_{e_1}}(d_{n_1,e_1}(t_k) - d_{n_2,e_1}(t_k)) + \right.\right.$$

-continued $$\alpha_{n_1,B}(t_k) - \alpha_{n_2,B}(t_k)\Bigg)\Bigg] \times$$

$$\exp\left[-j\frac{f_{c,B}}{f_{c,A}}(\alpha_{n_1,A}(t_k) - \alpha_{n_2,A}(t_k))\right]$$

$$\approx K \exp\left[-j\left(\frac{2\pi}{\lambda_{e_1}}(d_{n_1,e_1}(t_k) - d_{n_2,e_1}(t_k)) + \right.\right.$$

$$\alpha_{n_1,B}(t_k) - \alpha_{n_2,B}(t_k) - \frac{f_{c,B}}{f_{c,A}}(\alpha_{n_1,A}(t_k) -$$

$$\alpha_{n_2,A}(t_k))\Bigg)\Bigg]$$

Using EQ. 57, $$\alpha_{n,s}(t_k) = \frac{f_{c,n}}{f_{Ref}} \alpha_{n,Ref}(t_k) \qquad (59)$$

and $$\alpha_{n_1,B}(t_k) - \alpha_{n_2,B}(t_k) - \frac{f_{c,B}}{f_{c,A}}(\alpha_{n_1,A}(t_k) - \alpha_{n_2,A}(t_k)) = \qquad (60)$$

$$\frac{f_{c,B}}{f_{Ref}}\alpha_{n_1,Ref}(t_k) - \frac{f_{c,B}}{f_{Ref}}\alpha_{n_2,Ref}(t_k) -$$

$$\frac{f_{c,B}}{f_{c,A}}\left(\frac{f_{c,A}}{f_{Ref}}\alpha_{n_1,Ref}(t_k) - \frac{f_{c,A}}{f_{Ref}}\alpha_{n_2,Ref}(t_k)\right) = \frac{f_{c,B}}{f_{Ref}}\alpha_{n_1,Ref}(t_k) -$$

$$\frac{f_{c,B}}{f_{Ref}}\alpha_{n_2,Ref}(t_k) - \frac{f_{c,B}}{f_{Ref}}\alpha_{n_1,Ref}(t_k) + \frac{f_{c,B}}{f_{Ref}}\alpha_{n_2,Ref}(t_k) = 0$$

Substituting above, $$\hat{\rho}^C_{n_1,n_2,e_1}(t_k) \approx K\exp\left[-j\left(\frac{2\pi}{\lambda_{e_1}}(d_{n_1,e_1}(t_k) - d_{n_2,e_1}(t_k))\right)\right] \qquad (61)$$

Then EQ. 58 can be used in EQ. 32 to find the triple difference metric.

$$\hat{\eta}^C_{n_1,n_2,e_1}(t_k, t_{k-L}) = \hat{\rho}^C_{n_1,n_2,e_1}(t_k) \times \hat{\rho}^{C*}_{n_1,n_2,e_1}(t_{k-L}) \qquad (62)$$

$$\approx K\exp\left[-j\frac{2\pi}{\lambda_{e_1}}(d_{n_1,e_1}(t_k) - d_{n_2,e_1}(t_k) - \right.$$

$$d_{n_1,e_1}(t_{k-L}) + d_{n_2,e_1}(t_{k-L}))\bigg]$$

As will be appreciated by one skilled in the art, one or more aspects as described herein may be embodied as a computer program product. Accordingly, one or more aspects described herein may take the form of an entirely hardware embodiment, an entirely software embodiment (including firmware, resident software, micro-code, etc.) or an embodiment combining software and hardware aspects that may all generally be referred to herein as a "circuit," such as a signal processing circuit or a digital signal processing circuit. Furthermore, aspects of the disclosed method may take the form of a computer program product embodied in one or more computer readable medium(s) having computer readable program code embodied thereon.

A computer readable storage medium may be, for example, but not limited to, an electronic, magnetic, optical, electromagnetic, infrared or semiconductor system, apparatus, or device, or any suitable combination of the foregoing. More specific examples (a non-exhaustive list) of the computer readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with one or more processors. One or more processors as set forth herein can execute computer program code for performance of one or more methods as set forth herein, e.g. method 300.

Figure 4:
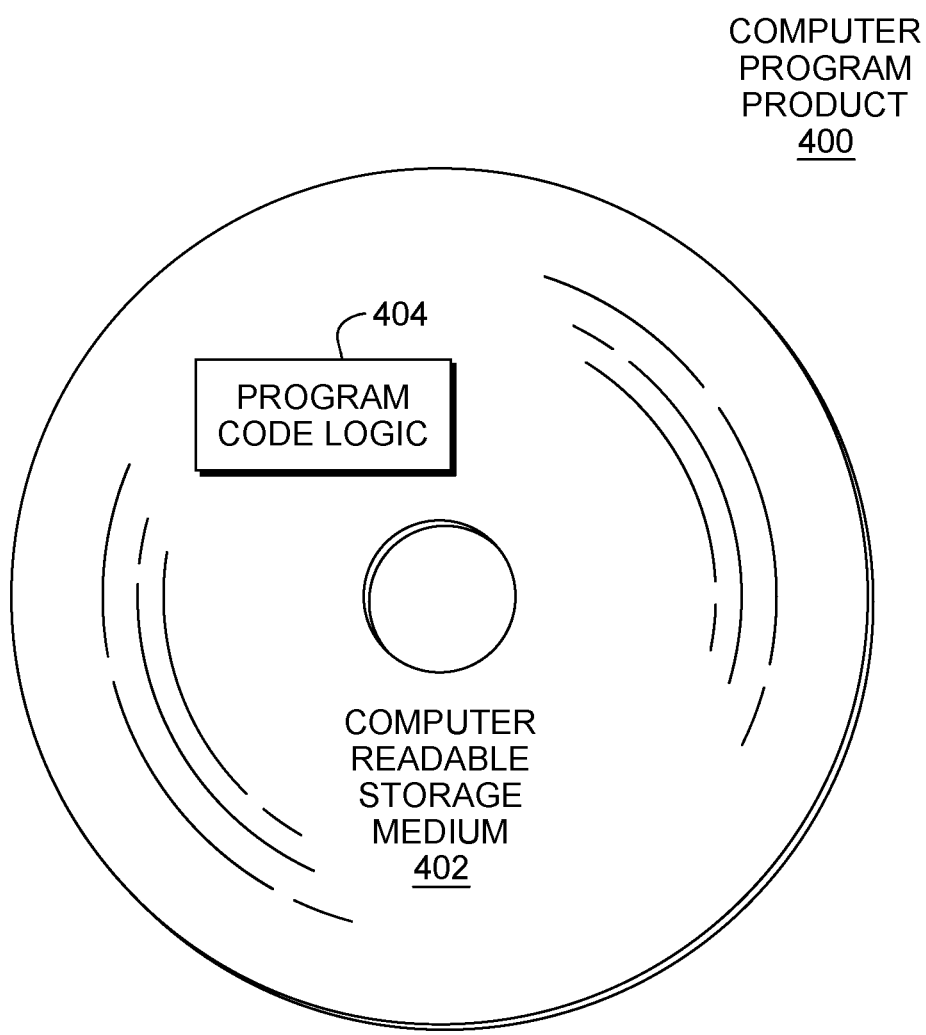

FIG. 4 depicts one example of a computer program product 400 that may include, for instance, one or more computer readable storage media 402 to store computer readable program code 404 stored on one or more computer readable media 402 thereon to provide and facilitate one or more aspects as described herein. Computer readable program code 404 may be executed by one or more processors for performance of one or more functions of method 300. Program code herein may be regarded as program logic.

Computer readable program code embodied on a computer readable medium, for instance a computer program product of FIG. 4, may be transmitted using an appropriate medium, including but not limited to wireless, wireline, optical fiber cable, radio frequency, etc., or any suitable combination of the foregoing. Any of the foregoing may be or be included in an input communications interface 280. The computer program code for execution by one or more processors for carrying out operations for aspects described herein, e.g. method 300, may be written in any combination of one or more programming languages. Some of the program code may be stored on computer readable storage media 402 included in one or more memory(ies) of one or more processor systems 223 of a digital signal processing circuit 220, as described in FIG. 1C and FIG. 1E. In one embodiment, a processor or processor system 223 of node 40 can execute program code stored on a memory of processor system 223 of node 40 for performance of a method, e.g. method 300. In one embodiment of an exemplary distributive processing system, a first processor of processor system 223 of a first node can execute program code stored on a memory of processor system 223 of the first node for performance of a first subset of functions or methods, e.g. of method 300, and a second processor or processing system 223 of a second node external to the first node can execute program code stored on a memory of a processing system 223 of the second node for performance of a second subset of functions of the method, e.g. method 300. In one embodiment the program code executed by processors of external nodes can be stored on a computer readable storage medium 404 external to either of first or second nodes. Program code, prior to execution, can be transmitted from such computer readable medium to a memory of one or more of nodes 40, 10, 10-N, and/or 20 for execution by a processor of the one or more node. In one embodiment one or more processors for execution of program code stored on one or more computer readable media can, for example, include parallel processors, e.g., bus connected parallel processors of a first node.

Approximating language, as used herein throughout the specification and claims, may be applied to modify any quantitative representation that could permissibly vary without resulting in a change in the basic function to which it is related. Accordingly, a value modified by a term or terms, such as "about," is not limited to the precise value specified. In some instances, the approximating language may correspond to the precision of an instrument for measuring the value.

The terminology used herein is for the purpose of describing particular examples only and is not intended to be limiting of the invention. As used herein, the singular forms "a", "an" and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include (and any form of include, such as "includes" and "including"), and "contain" (and any form of contain, such as "contains" and "containing") are open-ended linking verbs. As a result, a method or device that "comprises," "has," "includes" or "contains" one or more steps or elements possesses those one or more steps or elements, but is not limited to possessing only those one or more steps or elements. Likewise, a step of a method or an element of a device that "comprises," "has," "includes" or "contains" one or more features possesses those one or more features, but is not limited to possessing only those one or more features.

As used herein, the terms "may" and "may be" indicate a possibility of an occurrence within a set of circumstances; a possession of a specified property, characteristic or function; and/or qualify another verb by expressing one or more of an ability, capability, or possibility associated with the qualified verb. Accordingly, usage of "may" and "may be" indicates that a modified term is apparently appropriate, capable, or suitable for an indicated capacity, function, or usage, while taking into account that in some circumstances the modified term may sometimes not be appropriate, capable or suitable. For example, in some circumstances, an event or capacity can be expected, while in other circumstances the event or capacity cannot occur—this distinction is captured by the terms "may" and "may be."

While several aspects have been described and depicted herein, alternative aspects may be effected by those skilled in the art to accomplish the same objectives. Accordingly, it is intended by the appended claims to cover all such alternative aspects as fall within the true spirit and scope of the invention.

What is claimed is:

1. A method comprising:
obtaining at least one pair of reference channel values, at least one pair of target channel values, and a set of geolocation data, wherein the at least one pair of reference channel values are determined using reference signals received from one or more reference emitter, and wherein the at least one pair of target channel values are determined using target signals received from a target emitter;
processing by a signal processing circuit the at least one pair of reference channel values, the at least one pair of target channel values, and the set of geolocation data to determine a phase-difference metric; and,
processing by the signal processing circuit the phase-difference metric to determine one or more sets of spatial location coordinates.

2. The method of claim 1, wherein one set of spatial location coordinates of the one or more sets of spatial location coordinates corresponds to a location of a target emitter.

3. The method of claim 1, wherein the at least one pair of reference channel values is an at least one first pair of reference channel values, the at least one pair of target channel values includes a first pair of target channel values, the set of geolocation data includes a first set of geolocation data, and the phase-difference metric includes a first phase-difference metric, and the method further comprises:
obtaining at least one second pair of reference channel values and a second pair of target reference channel values;
obtaining a second set of geolocation data; combining the at least one second pair of reference channel values, the second pair of target channel values, and the second set of geolocation data to determine a second phase-difference metric;
combining the first phase-difference metric and the second phase-difference metric to determine a location metric; and,
processing the location metric to determine the one or more sets of spatial location coordinates.

4. The method of claim 3, further comprising processing the one or more sets of spatial location coordinates to determine a velocity.

5. The method of claim 3, wherein the at least one pair of target channel values includes a first target channel value determined using a first target signal received from a target emitter by a first receiver node at a first time, and a second target channel value determined using a second target signal received from the target emitter by a second receiver node at the first time, wherein the second pair of target channel values includes a third target channel value determined using a first target signal received from a target emitter by the first receiver node at a second time, and a fourth target channel value determined using a second target signal received from the target emitter by the second receiver node at the second time.

6. The method of claim 3, wherein the at least one pair of target channel values includes a first target channel value determined using a first target signal received from a target emitter by a first receiver node at a first time, and a second target channel value determined using a second target signal received from the target emitter by a second receiver node at a first time, wherein the second pair of target channel values includes a third target channel value determined using a first target signal received from a target emitter by a third receiver node at a second time, and a fourth target channel value determined using a second target signal received from the target emitter by a fourth receiver node at the second time.

7. The method of claim 3, wherein the at least one pair of target channel values includes a first target channel value determined using a first target signal received from a target emitter by a first receiver node at a first time, and a second target channel value determined using a second target signal received from the target emitter by a second receiver node at the first time, wherein the second pair of target channel values includes a third target channel value determined using a first target signal received from a target emitter by the first receiver node at a second time, and a fourth target channel value determined using a second target signal received from the target emitter by a third receiver node at the second time.

8. The method of claim 1, wherein the at least one pair of reference channel values includes a first reference channel value determined using a first reference signal received from a reference emitter by a first receiver node, and a second target channel value determined using a second reference signal received from the reference emitter by a second receiver node.

9. The method of claim 1, wherein the at least one pair of reference channel values includes a first reference channel value determined using a first reference signal received from a first reference emitter by a receiver node, and a second target channel value determined using a second reference signal received from a second reference emitter by the receiver node.

10. The method of claim 1, wherein the at least one pair of target channel values includes a first target channel value determined using a first target signal received from a target emitter by a first receiver node, and a second target channel value determined using a second target signal received from the target emitter by a second receiver node.

11. The method of claim 1, wherein the at least one pair of reference channel values includes a first reference channel value determined using a first reference signal received from a reference emitter by a first receiver node, and a second reference channel value determined using a second reference signal received from the reference emitter by a second receiver node, wherein the at least one pair of target channel values includes a first target channel value determined using a first target signal received from a target emitter by the first receiver node, and a second target channel value determined using a second target signal received from the target emitter by the second receiver node.

12. The method of claim 1, wherein the at least one pair of reference channel values includes a first reference channel value determined using a first reference signal received from a reference emitter by a first receiver node at a first time, and a second reference channel value determined using a second reference signal received from the reference emitter by a second receiver node at the first time, wherein the at least one pair of target channel values includes a first target channel value determined using a first target signal received from a target emitter by the first receiver node at the first time, and a second target channel value determined using a second target signal received from the target emitter by the second receiver node at the first time.

13. The method of claim 1, wherein the at least one pair of reference channel values includes a set of reference channel having a first reference channel value determined using a first reference signal received from a reference emitter by a receiver node at a first time, and a second reference channel value determined using a second reference signal received from the reference emitter by the receiver node at a second time.

14. The method of claim 1, wherein the at least one pair of reference channel values includes a set of reference channel values having a first reference channel value determined using a first reference signal received from a reference emitter by a receiver node at a first time, and a second reference channel value determined using a second reference signal received from the reference emitter by the receiver node at a second time, wherein the at least one pair of target channel values includes a set of target channel values having a first target channel value determined using a first target signal received from a target emitter by a receiver node at the first time, and a second target channel value determined using a second target signal received from the target emitter by the receiver node at a second time.

15. The method of claim 1, wherein the signal processing circuit is one of the following selected from the group consisting of (a) defined by signal processing circuitry of a single node, and (b) defined by signal processing circuitry distributed between nodes.

16. An apparatus comprising a signal processing circuit, the signal processing circuit being configured to perform a method, the method comprising:
obtaining, from an input communications interface, at least one pair of reference channel values, at least one pair of target channel values, and a set of geolocation data, wherein the at least one pair of reference channel values are determined using reference signals received from one or more reference emitter, and wherein the at least one pair of target channel values are determined using target signals received from a target emitter;
processing the at least one pair of reference channel values, the at least one pair of target channel values, and the set of geolocation data to determine a phase-difference metric; and,
processing the phase-difference metric to determine one or more sets of spatial location coordinates.

17. The apparatus of claim 16, wherein the at least one pair of reference channel values is one pair of reference channel values of a plurality of pairs of reference channel values, and the method further comprises processing the plurality of pairs of reference channel values with the at least one pair of target channel values and the set of geolocation data to determine the phase-difference metric.

18. The apparatus of claim 16, wherein the at least one pair of reference channel values correspond to an at least one reference emitter, the at least one reference emitter having a known location.

19. An apparatus comprising: a signal processing circuit, the signal processing circuit being configured to: obtain, from a radio-frequency receiver, at least one reference signal and a target signal; process the target signal to determine a target channel value and the at least one reference signal to determine at least one reference channel value; and output, to a radio-frequency transmitter, the target channel value and the at least one reference channel value.

20. The apparatus of claim 19, wherein the signal processing circuit is further configured to obtain geolocation information for the apparatus, and to output, to the radio-frequency transmitter, the geolocation information.

21. The apparatus of claim 19, wherein the signal processing circuit is further configured to extract information about the at least one reference signal, and wherein processing the target signal to determine a target channel value comprises combining the information about the at least one reference signal with the target signal to determine the target channel value.

22. The apparatus of claim 19, wherein the at least one reference signal is one reference signal of a plurality of reference signals and the at least one reference channel value is one reference channel value of a plurality of reference channel values, each of the plurality of reference channel values being determined from one reference signal of the plurality of reference signals.

23. The apparatus of claim 19, wherein the at least one reference signal is output by at least one reference emitter, the at least one reference emitter having a known location.

24. The apparatus of claim 19, wherein the signal processing circuit is further configured to obtain a time value, the time value corresponding to a time at which the signal processing circuit obtains the at least one reference signal and the target signal.

25. The apparatus of claim 24, wherein the signal processing circuit is further configured to associate the time value with the at least one reference channel value and the target channel value, and to output, to the radio-frequency transmitter, the time value associated with the at least one reference channel value and the target channel value.

26. The apparatus of claim 25, wherein the apparatus is operative to move from a first location to a second location over a time interval T1 to T2, wherein the at least one reference signal is an at least one first reference signal obtained at time T1 and the target signal is a first target signal obtained at time T1, the at least one reference channel value is an at least one first reference channel value and the target channel value is a first target channel value, and wherein the signal processing circuit is further configured to: obtain, from the radio-frequency receiver at time T2, at least one second reference signal and a second target signal; determine an at least one second reference channel value for the at least one second reference signal; determine a second target channel value for the second target signal; and, output, to the radio-frequency transmitter, the at least one second reference channel value and the second target channel value.

27. A computer program product, comprising: one or more computer readable storage media readable by one or more processors for execution by the one or more processors to perform a method, the method comprising:
obtaining at least one pair of reference channel values, at least one pair of target channel values, and a set of geolocation data, wherein the at least one pair of reference channel values are determined using reference signals received from one or more reference emitter, and wherein the at least one pair of target channel values are determined using target signals received from a target emitter;
processing the at least one pair of reference channel values, the at least one pair of target channel values, and the set of geolocation data to determine a phase-difference metric; and,
processing the phase-difference metric to determine one or more sets of spatial location coordinates.

28. A system, comprising: at least one reference emitter capable of transmitting a reference signal, the at least one reference emitter having a known location; a plurality of receiver nodes, the plurality of receiver nodes being operative to move, and the plurality of receiver nodes configured to receive the reference signal and from a target emitter a target signal, determine at least one pair of reference channel values and at least one pair of target channel values, and, a processing node, the processing node being configured to obtain the at least one pair of reference channel values and at least one pair of target channel values, and process the at least one pair of reference channel values and at least one pair of target channel values to determine spatial location coordinates, wherein the spatial location coordinates correspond to a location of the target emitter.

29. The system of claim 28, wherein the processing node is one of the following selected from the group consisting of (a) external to the at least one reference emitter and the plurality of receiver nodes, (b) co-located with a reference emitter of the at least one reference emitter, and (c) co-located with a receiver node of the plurality of receiver nodes.

* * * * *